(12) United States Patent
Saito et al.

(10) Patent No.: US 11,979,545 B2
(45) Date of Patent: May 7, 2024

(54) INFORMATION PROCESSING APPARATUS AND INFORMATION PROCESSING METHOD

(71) Applicant: SONY GROUP CORPORATION, Tokyo (JP)

(72) Inventors: Mari Saito, Tokyo (JP); Kenji Sugihara, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 306 days.

(21) Appl. No.: 17/426,802

(22) PCT Filed: Dec. 11, 2019

(86) PCT No.: PCT/JP2019/048407
§ 371 (c)(1),
(2) Date: Jul. 29, 2021

(87) PCT Pub. No.: WO2020/162035
PCT Pub. Date: Aug. 13, 2020

(65) Prior Publication Data
US 2022/0116576 A1   Apr. 14, 2022

(30) Foreign Application Priority Data
Feb. 7, 2019 (JP) .................................. 2019-020618

(51) Int. Cl.
*H04N 13/156* (2018.01)
*G06F 3/14* (2006.01)
(Continued)

(52) U.S. Cl.
CPC .............. *H04N 13/156* (2018.05); *G06F 3/14* (2013.01); *G06F 3/165* (2013.01); *H04N 13/351* (2018.05); *H04N 13/366* (2018.05); *H04R 3/00* (2013.01)

(58) Field of Classification Search
CPC .. H04N 13/156; H04N 13/351; H04N 13/366; G06F 3/14; G06F 3/165; H04R 3/00
(Continued)

(56) References Cited

U.S. PATENT DOCUMENTS 5,710,875 A * 1/1998 Harashima .............. G06T 15/10
345/419
5,802,294 A * 9/1998 Ludwig ................ H04L 12/1831
348/E7.083
(Continued)

FOREIGN PATENT DOCUMENTS

CN          108886599 A    11/2018
EP            3389260 A1   10/2018
(Continued)

OTHER PUBLICATIONS

International Search Report and Written Opinion of PCT Application No. PCT/JP2019/048407, dated Mar. 17, 2020, 8 pages of ISRWO.

*Primary Examiner* — Binh Kien Tieu
(74) *Attorney, Agent, or Firm* — CHIP LAW GROUP

(57) ABSTRACT

An information processing apparatus according to the present technology includes an image obtaining unit and a display control unit. The image obtaining unit obtains a plurality of first divided images obtained by dividing a first image showing a first location along a second direction substantially perpendicular to a first direction, and a plurality of second divided images obtained by dividing a second image showing a second location along the second direction. The display control unit arranges and simultaneously displays the plurality of first divided images and the plurality of second divided images along the first direction on a display device of a user at a third location.

16 Claims, 21 Drawing Sheets

(51) Int. Cl.
*G06F 3/16* (2006.01)
*H04N 13/351* (2018.01)
*H04N 13/366* (2018.01)
*H04R 3/00* (2006.01)

(58) Field of Classification Search
USPC ..................................................... 348/14.07
See application file for complete search history.

(56) References Cited

U.S. PATENT DOCUMENTS

| | | | |
|---|---|---|---|
| 9,646,380 B2* | 5/2017 | Tasaka | H04N 13/10 |
| 2009/0199105 A1* | 8/2009 | Kamada | G06Q 10/10 |
| | | | 707/999.103 |
| 2014/0028590 A1* | 1/2014 | Itaya | G06F 3/0354 |
| | | | 345/173 |
| 2014/0253668 A1* | 9/2014 | Yoshida | H04N 7/15 |
| | | | 348/14.07 |
| 2016/0221567 A1* | 8/2016 | Ogawa | B60K 6/442 |
| 2017/0052757 A1* | 2/2017 | Kanda | H04N 7/147 |
| 2018/0352193 A1 | 12/2018 | Sakai et al. | |
| 2019/0110023 A1 | 4/2019 | Sakai et al. | |
| 2020/0253527 A1* | 8/2020 | Ellison | A61B 5/165 |

FOREIGN PATENT DOCUMENTS

| | | |
|---|---|---|
| EP | 3461125 A1 | 3/2019 |
| JP | 05-284493 A | 10/1993 |
| JP | 2011-191899 A | 9/2011 |
| WO | 2017/098772 A1 | 6/2017 |
| WO | 2017/199483 A1 | 11/2017 |

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/048407 filed on Dec. 11, 2019, which claims priority benefit of Japanese Patent Application No. JP 2019-020618 filed in the Japan Patent Office on Feb. 7, 2019. Each of the above-referenced applications is hereby incorporated herein by reference in its entirety.

TECHNICAL FIELD

The present technology relates to an information processing apparatus, an information processing method, and a program that are applicable to display control of virtual reality (VR), augmented reality (AR), and the like.

BACKGROUND ART

In the image processing apparatus described in Patent Literature 1, the position and posture of a virtual object, and the position of a virtual viewpoint and the direction of a virtual line of sight of a user are stored. On the basis of the change in the position of the virtual viewpoint and the direction of the virtual line of sight of the user, an image representing a state where the virtual object is viewed from the position of the virtual viewpoint of the user in the direction of the virtual line of sight is displayed. This makes it possible for the user to change the view of the virtual object with a simple operation (see, e.g., paragraphs [0058] and [0063] of the specification, FIGS. 7 and 8, and the like of Patent Literature 1).

CITATION LIST

Patent Literature

Patent Literature 1: Japanese Patent Application Laid-open No. 2011-191899

DISCLOSURE OF INVENTION

Technical Problem

As described above, there is a need for a technique capable of providing a high-quality viewing experience regarding the display control of VR and the like.

In view of the above circumstances, it is an object of the present technology to provide an information processing apparatus, an information processing method, and a program that are capable of providing a high-quality viewing experience.

Solution to Problem

In order to achieve the above object, an information processing apparatus according to an embodiment of the present technology includes an image obtaining unit and a display control unit.

The image obtaining unit obtains a plurality of first divided images obtained by dividing a first image showing a first location along a second direction substantially perpendicular to a first direction, and a plurality of second divided images obtained by dividing a second image showing a second location along the second direction.

The display control unit arranges and simultaneously displays the plurality of first divided images and the plurality of second divided images along the first direction on a display device of a user at a third location.

In such an information processing apparatus, the plurality of first divided images obtained by dividing the first image and the plurality of second divided images obtained by dividing the second image are simultaneously displayed side by side on the display device. This makes it possible to provide a high-quality viewing experience.

The display control unit may change a relative relationship of visibility between the plurality of first divided images and the plurality of second divided images in accordance with a change in situation of at least one of the first location, the second location, or the third location.

The change in situation may include at least one of a change in motion of an object or a change in sound emitted by the object at at least one of the first location, the second location, or the third location.

The object may include a person at the first location or the second location.

The change in situation may include a call from the person to the user of the display device as the change in sound emitted by the object.

The object may include the user of the display device.

The change in situation may include a change in posture of the user of the display device.

The first direction may be a horizontal direction. In this case, the change in posture of the user of the display device may be a change in posture in the horizontal direction.

The display control unit may control the display device such that positions of the plurality of first divided images and the plurality of second divided images are different from each other in a depth direction when viewed from the user. In this case, the change in situation may include a change in convergence distance of the user of the display device.

The display control unit may control the display device such that a plurality of divided images, which corresponds to the convergence distance of the user, is arranged closer to the user than another plurality of divided images, which does not correspond to the convergence distance of the user, between the plurality of first divided images and the plurality of second divided images.

The display control unit may make the visibility of images of a location where the change in situation has occurred higher than the visibility of other images between the plurality of first divided images and the plurality of second divided images.

The information processing apparatus may further include a sound output control unit that controls a sound output device of the user to change a relative relationship between a first sound output corresponding to the first image and a second sound output corresponding to the second image in accordance with a change in the relative relationship of visibility.

The sound output control unit may make a sound output corresponding to a plurality of divided images having higher visibility larger than a sound output corresponding to another plurality of divided images between the plurality of first divided images and the plurality of second divided images.

The display control unit may cause the display device to display an image in which a sound output corresponding to a plurality of divided images having lower visibility between the plurality of first divided images and the plurality of second divided images is converted into text.

The information processing apparatus may further include a communication control unit that transmits an image to a first display device at the first location and a second display device at the second location. In this case, the image obtaining unit may obtain an image showing the third location and including an image of the user of the display device obtained by an imaging device. In this case, the communication control unit may transmit the image showing the third location to the first display device and the second display device simultaneously and in real time.

An information processing method according to an embodiment of the present technology is an information processing method executed by a computer system, the method including: obtaining a plurality of first divided images obtained by dividing a first image showing a first location along a second direction substantially perpendicular to a first direction, and a plurality of second divided images obtained by dividing a second image showing a second location along the second direction; and arranging and simultaneously displaying the plurality of first divided images and the plurality of second divided images along the first direction on a display device of a user at a third location.

A program according to an embodiment of the present technology causes a computer system to execute the steps of: obtaining a plurality of first divided images obtained by dividing a first image showing a first location along a second direction substantially perpendicular to a first direction, and a plurality of second divided images obtained by dividing a second image showing a second location along the second direction; and arranging and simultaneously displaying the plurality of first divided images and the plurality of second divided images along the first direction on a display device of a user at a third location.

Advantageous Effects of Invention

As described above, according to the present technology, it is possible to provide a high-quality viewing experience. Note that the effects described here are not necessarily limitative, and any of the effects described in the present disclosure may be provided.

MODE(S) FOR CARRYING OUT THE INVENTION

Embodiments according to the present technology will now be described below with reference to the drawings.

[Intercommunication System]

Figure 1:
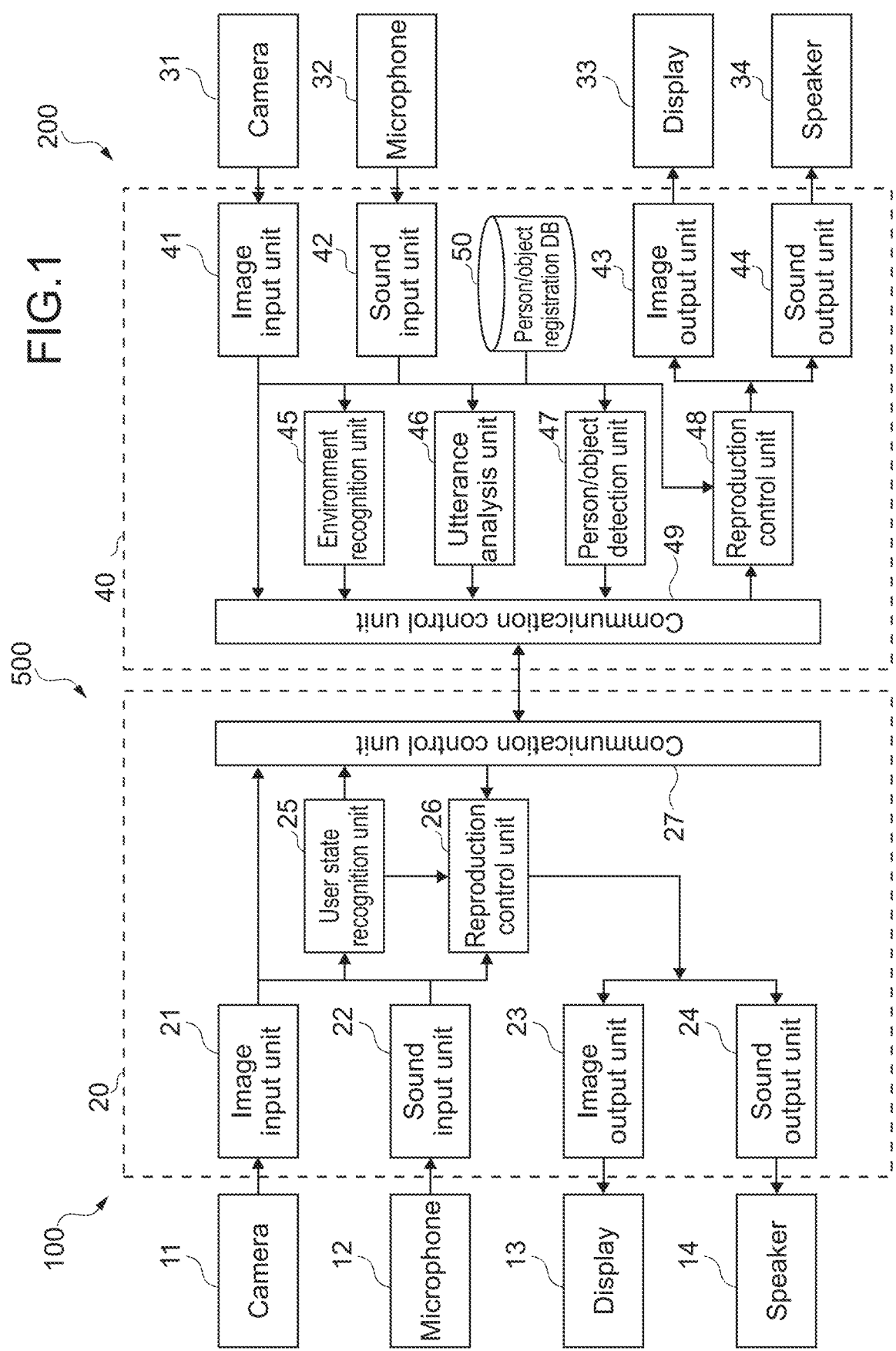
FIG. 1 is a block diagram showing an example of a functional configuration of an intercommunication system according to an embodiment of the present technology.

FIG. 1 is a block diagram showing an example of a functional configuration of an intercommunication system 500 according to an embodiment of the present technology. The intercommunication system 500 is capable of implementing telecommunication between different locations.

In this embodiment, a case where communication is performed between persons on respective 7th, 8th, and 9th floors of a building will be exemplified. Further, a case where a communication control apparatus 20 functioning as an embodiment of an information processing apparatus according to the present technology is disposed on the 7th floor will be exemplified. Hereinafter, the present technology will be described by taking a person on the 7th floor as a user and persons on the 8th and 9th floors as communication partners.

In this embodiment, the 7th floor corresponds to a third location. The 8th and 9th floors correspond to first and second locations. The specific location is not limited, and the present technology is applicable to any location. Further, the number of locations is not limited, and the present technology is applicable to any number of three or more locations.

The intercommunication system 500 includes a communication system 100 built on the 7th floor and a communication system 200 built on each of the 8th and 9th floors. Note that FIG. 1 shows one communication system 200, but the communication system 200 is built on each of the 8th and 9th floors one by one.

The communication system 100 includes a camera 11, a microphone 12, a display 13, a speaker 14, and a communication control apparatus 20. The camera 11, the microphone 12, the display 13, and the speaker 14 are connected to the communication control apparatus 20. The method of connecting the camera 11 and the like to the communication control apparatus 20 is not limited, and any communication method such as a wireless method, a wired method, or the like may be employed.

The camera 11 is capable of capturing an image of the 7th floor where the user is located. Thus, an image showing the 7th floor (image data) is obtained by the camera 11. Of course, when the user is on the 7th floor, an image including an image of the user is captured. In this embodiment, the camera 11 functions as an imaging device that obtains an image showing a third location including an image of the user. The specific configuration of the camera 11 is not limited.

Various images and GUIs are displayed on the display 13. For example, an image of the 7th floor captured by the camera 11 is displayed on the display 13. Further, images of the 8th and 9th floors captured by the cameras 31 installed in the respective 8th and 9th floors are displayed. Of course, when there is a person on the 8th or 9th floor, an image including an image of the person is displayed.

In this embodiment, a composite image 80 to be described later (see FIG. 7) is displayed on the display 13. In addition, any image such as a text image, an icon image, or a cursor may be displayed. In this embodiment, the display 13 corresponds to a display device of the user. The specific configuration of the display 13 is not limited. For example, the display 13 may be configured by a television device, a 3D TV device, a head mounted display (HMD), or the like.

The microphone 12 is capable of collecting sounds generated on the 7th floor where the user is located. For example, the microphone 12 detects the voice uttered by the user or surrounding sounds. The specific configuration of the microphone 12 is not limited.

The speaker 14 is capable of outputting various sounds. For example, the speaker 14 is capable of outputting the voice of the user or the like obtained by the microphone 12. Further, the speaker 14 is capable of outputting sounds obtained by the microphones 32 installed in the 8th and 9th floors. For example, the voices spoken by persons on the 8th and 9th floors can be output from the speaker 14. The specific configuration of the speaker 14 is not limited.

The user can make a voice call with a person on another floor via the microphone 12 and the speaker 14. The user can also listen intently to sounds generated on other floors. The user can also input various instructions to the communication control apparatus 20 or the like by voice input.

In this embodiment, the person at each location is included in an object. That is, the user on the 7th floor, the communication partners on the 8th and 9th floors are included in the object according to the present technology. Note that the object is not limited to a person, and any object such as an animal, a robot, various devices, and the like is also included in the object according to the present technology.

The communication control apparatus 20 includes, for example, hardware necessary for the configuration of a computer such as a CPU (processor), a ROM, a RAM, and an HDD. The information processing method according to the present technology is executed when the CPU loads a program according to the present technology, which is recorded in advance in the ROM or the like, into the RAM and executes the program.

For example, the communication control apparatus 20 can be implemented by any computer such as a personal computer (PC). It is needless to say that any hardware such as a GPU, a FPGA, or ASIC may be used to implement the communication control apparatus 20.

In this embodiment, the CPU or the like of the communication control apparatus 20 executes a predetermined program, and thus an image input unit 21, a sound input unit 22, an image output unit 23, a sound output unit 24, a user state recognition unit 25, a reproduction control unit 26, and a communication control unit 27 are implemented as functional blocks. In order to implement each block, dedicated hardware such as an integrated circuit (IC) may be used.

The program is installed on the communication control apparatus 20 through, for example, various recording media. Alternatively, the installation of the program may be executed via the Internet or the like.

The type or the like of the recording medium on which the program according to the present technology is recorded is not limited, and any computer readable recording medium may be used. For example, any recording medium that non-temporarily records data may be used.

An image captured by the camera 11 is input to the image input unit 21. In this embodiment, an image of the 7th floor where the user is located is input. That is, in this embodiment, an image showing the third location including the image of the user of the display device obtained by the imaging device is input to the image input unit 21. In this embodiment, the image input unit 21 is capable of functioning as a part of the image obtaining unit.

Note that, in the present disclosure, the image includes both a still image and a moving image (video). In this embodiment, a video including a plurality of frames captured at a predetermined frame rate is captured by the camera 11. The video data (a plurality of frames) thereof is input to the image input unit 21.

A sound (sound data) detected by the microphone 12 is input to the sound input unit 22.

The image output unit 23 outputs an image by controlling the display operation of the display 13. In this embodiment, the reproduction control unit 26 outputs image data and a control signal to be displayed on the display 13 to the image output unit 23. The image output unit 23 controls the display operation of the display 13 on the basis of the image data and the control signal output from the reproduction control unit 26.

The sound output unit 24 outputs a sound by controlling a sound output operation of the speaker 14. In this embodiment, the reproduction control unit 26 outputs sound data and a control signal to be output from the speaker 14 to the sound output unit 24. The sound output unit 24 controls the sound output operation of the speaker 14 on the basis of the sound data and the control signal output from the reproduction control unit 26.

The user state recognition unit 25 recognizes the state of the user on the 7th floor on the basis of the image input to the image input unit 21 and the sound input to the sound input unit 22. In this embodiment, the user state recognition unit 25 recognizes the line of sight of the user, the convergence of the user, the posture of the user, the contents of the utterance of the user, and the like.

For example, the user state recognition unit 25 is capable of recognizing a change in the line of sight of the user, a change in the convergence of the user, a change in the posture of the user such as looking in the display 13, and the like. In addition, the user state recognition unit 25 is capable of recognizing the contents of an utterance such as a call to a communication partner at another location. Note that the utterance of the user corresponds to a change in sound emitted by the user (change in sound). Consequently, recognizing the contents of the utterance of the user corresponds to recognizing the change in sound emitted by the user.

In this embodiment, a change in the line of sight of the user, a change in the convergence of the user, a change in the posture of the user, and an utterance of the user (change in sound emitted by the user) are included in a change in situation of the 7th floor (third location). For example, a call of a communication partner on another floor corresponds to a change in sound emitted by the user and is included in a change in situation of the 7th floor.

The specific method for recognizing the state of the user is not limited, and any technique may be used. For example, any machine-learning algorithm using a deep neural network (DNN) or the like may be used. For example, it is possible to improve the recognition accuracy of the state of the user by using artificial intelligence (AI) or the like for performing deep learning.

The communication control unit 27 controls communication with the communication control apparatuses 40 disposed on the other floors (locations on the 8th and 9th floors). Note that the method of communicably connecting the communication control apparatuses 20 (40) of the respective floors is not limited. For example, any network such as a wide area network (WAN) or a local area network (LAN) is used. The communication control unit 27 is capable of transmitting and receiving various types of information (data) by controlling communication devices such as a module for establishing communication and a router.

In this embodiment, the communication control unit 27 is capable of transmitting the image input to the image input unit 21 and the sound input to the sound input unit 22 to the communication control unit 49 on another floor. Further, the communication control unit 27 is capable of transmitting data of a recognition result of the user state recognition unit 25. Further, the communication control unit 27 receives various types of information (data) output from the communication control unit 49 of another communication control apparatus 40.

In this embodiment, the communication control unit 27 is capable of transmitting images to the display 33 on the 8th (9th) floor. The communication control unit 27 is also capable of transmitting an image showing the 7th floor, for example, including an image of the user of the display 13 obtained by the camera 11, to the display 33 on the 8th floor and to the display 33 on the 9th floor simultaneously and in real time.

The reproduction control unit 26 controls the image display by the display 13 and the sound output by the speaker 14. The reproduction control unit 26 outputs the image data and the control signal to be displayed on the display 13 to the image output unit 23. Further, the reproduction control unit 26 outputs the sound data and the control signal to be output from the speaker 14 to the sound output unit 24.

The reproduction control unit 26 is capable of controlling the image display and the sound output on the basis of the image input to the image input unit 21, the sound input to the sound input unit, the recognition result of the user state recognition unit 25, and various types of information received by the communication control unit 27.

In this embodiment, a composite image 80 to be described later (see FIG. 7) is generated by the reproduction control unit 26. The display of the composite image 80 is then controlled. In this embodiment, the reproduction control unit 26 functions as an image obtaining unit, a display control unit, and a sound output control unit.

The communication system 200 built on each of the 8th and 9th floors includes a camera 31, a microphone 32, a display 33, a speaker 34, and the communication control apparatus 40. The camera 31, the microphone 32, the display 33, and the speaker 34 are connected to the communication control apparatus 40.

The camera 31 is capable of capturing an image of the 8th (9th) floor where a communication partner is located. Thus, an image showing the 8th (9th) floor (image data) is obtained by the camera 31. Of course, when the communication partner is on the 8th (9th) floor, an image including an image of the communication partner is captured.

Various images and GUIs are displayed on the display 33. For example, an image of each floor (including an image of a person) is displayed on the display 33. In addition, any image such as a text image, an icon image, or a cursor may be displayed. In this embodiment, the display 13 functions as a first device at a first location (a second display device at a second location).

The microphone 32 is capable of collecting sounds (voices) generated on the 8th (9th) floor where the communication partner is located. For example, the microphone 32 detects the voice uttered by the communication partner or surrounding sounds.

The speaker 34 is capable of outputting various sounds. For example, the speaker 34 is capable of outputting the voice uttered by a person on each floor, a sound generated on each floor, or the like.

For example, a person on the 8th (9th) floor can make a voice call with a person on another floor via the microphone 32 and the speaker 34. Further, the person on the 8th (9th) floor can also listen intently to sounds generated on other floors. Further, the person on the 8th (9th) floor can also input various instructions to the communication control apparatus 40 or the like by voice input.

The communication control apparatus 40 includes, for example, hardware necessary for the configuration of a computer such as a CPU (processor), a ROM, a RAM, and an HDD. The information processing method according to the present technology is executed when the CPU loads a program according to the present technology, which is recorded in advance in the ROM or the like, into the RAM and executes the program.

For example, the communication control apparatus 40 can be implemented by any computer such as a personal computer (PC). It is needless to say that any hardware such as a GPU, a FPGA, or ASIC may be used to implement the communication control apparatus 20.

In this embodiment, the CPU or the like of the communication control apparatus 40 executes a predetermined program, and thus an image input unit 41, a sound input unit 42, an image output unit 43, a sound output unit 44, an environment recognition unit 45, an utterance analysis unit 46, a person/object detection unit 47, a reproduction control unit 48, and a communication control unit 49 are implemented as functional blocks. The method of installing the program is not limited.

Further, in this embodiment, a person/object registration DB 50 is built in the communication control apparatus 40. The person/object registration DB 50 is built by, for example, a storage medium such as an HDD provided in the communication control apparatus 40. Needless to say, the present technology is not limited thereto, and the person/ object registration DB 50 may be constructed by a storage device configured separately from the communication control apparatus 40.

An image captured by the camera 31 is input to the image input unit 41. In this embodiment, an image of the 8th (9th) floor where the communication partner is located is input. That is, in this embodiment, a first image (second image) showing the first location (second location) is input to the image input unit 41.

A sound (sound data) detected by the microphone 12 is input to the sound input unit 42.

The image output unit 43 outputs an image by controlling the display operation of the display 33. In this embodiment, the reproduction control unit 48 outputs image data and a control signal to be displayed on the display 33 to the image output unit 43. The image output unit 43 controls the display operation of the display 33 on the basis of the image data and the control signal output from the reproduction control unit 48.

The sound output unit 44 outputs a sound by controlling a sound output operation of the speaker 34. In this embodiment, the reproduction control unit 48 outputs sound data and a control signal to be output from the speaker 34 to the sound output unit 44. The sound output unit 44 controls the sound output operation of the speaker 34 on the basis of the sound data and the control signal output from the reproduction control unit 48.

The environment recognition unit 45 recognizes the environment of the 8th (9th) floor on the basis of the image input to the image input unit 41 and the sound input to the sound input unit 42. For example, the environment recognition unit 45 recognizes an operation of a person or an object on the 8th (9th) floor, sounds such as noise generated on the floor, or the like. The technologies for environment recognition are not limited, and any algorithm such as machine learning may be used, for example.

The utterance analysis unit 46 analyzes the utterance of the person on the basis of the sound input to the sound input unit 42. For example, the utterance analysis unit 46 is capable of recognizing the contents of an utterance such as a call from a person on the 8th (9th) floor to a person at another location. In addition, the utterance analysis unit 46 is capable of analyzing whether the contents of the utterance of the person include a particular keyword registered in the person/object registration DB 50. The technologies for the utterance analysis are not limited, and any algorithm such as machine learning may be used, for example.

In this embodiment, the environment recognition unit 45 and the utterance analysis unit 46 detect a change in situation of the location on the 8th (9th) floor. For example, an environmental change of the 8th (9th) floor is detected as a change in situation of the location. Further, an utterance of a person on the 8th (9th) floor (change in sound emitted by the person) is detected as a change in situation of the location. For example, a call of a person on the 8th (9th) floor to a person on the 7th floor can also be detected as a change in situation of the location.

Further, the function of the user state recognition unit 25 in the communication control apparatus 20 on the 7th floor may be provided in the communication control apparatus 40 on the 8th (9th) floor. Changes in the line of sight, convergence, posture, or the like of the person on the 8th (9th) floor may be detected as changes in situation of the location. For example, a motion of looking in the display 33 of a person on the 8th (9th) floor may be detected as a change in situation of the location.

The person/object detection unit 47 detects a person or an object appearing in the image on the basis of an image input to the image input unit 41. For example, it is determined whether or not a person or an object appearing in the image is a person or an object registered in the person/object registration DB 50. The technologies for detecting a person or an object appearing in the image are not limited, and any image analysis technology such as the matching technology may be used. Of course, machine learning or the like may be used.

Information of a predetermined person, information of an object, a particular word, and the like are registered in the person/object registration DB 50. For example, in the person/object registration DB 50, information such as images and names of staff, etc. of a company or the like in which the communication system 500 is built, and images or arrangement places of fixtures are registered. In addition, predetermined words and the like used for conversations are registered in the person/object registration DB 50.

The reproduction control unit 48 controls the image display by the display 33 and the sound output by the speaker 34. The reproduction control unit 48 outputs the image data and the control signal to be displayed on the display 33 to the image output unit 43. Further, the reproduction control unit 48 outputs the sound data and the control signal to be output from the speaker 34 to the sound output unit 44.

The communication control unit 49 controls communication with the communication control apparatus 20 disposed on the 7th floor. In this embodiment, the communication control unit 49 is capable of transmitting the image input to the image input unit 41 and the sound input to the sound input unit 42 to the communication control unit 49 on the 7th floor. That is, an image of the 8th floor and an image of the 9th floor, which respectively correspond to the image showing the first location and the image showing the second location, are transmitted from the communication control unit 49 to the communication control unit 27. Further, voice such as an utterance of a person on the 8th floor and voice such as an utterance of a person on the 9th floor are transmitted from the communication control unit 49 to the communication control unit 27.

Further, the communication control unit 49 transmits the recognition result by the environment recognition unit 45, the analysis result by the utterance analysis unit 46, and the detection result by the person/object detection unit 47 to the communication control unit 27 on the 7th floor. In addition, any information (data) may be transmitted to the communication control unit 27 on the 7th floor. Of course, communication is appropriately executed between the communication control unit 49 of the communication control apparatus 40 on the 8th floor and the communication control unit 49 of the communication control apparatus 40 on the 9th floor.

[Composite Image]

Figure 2:
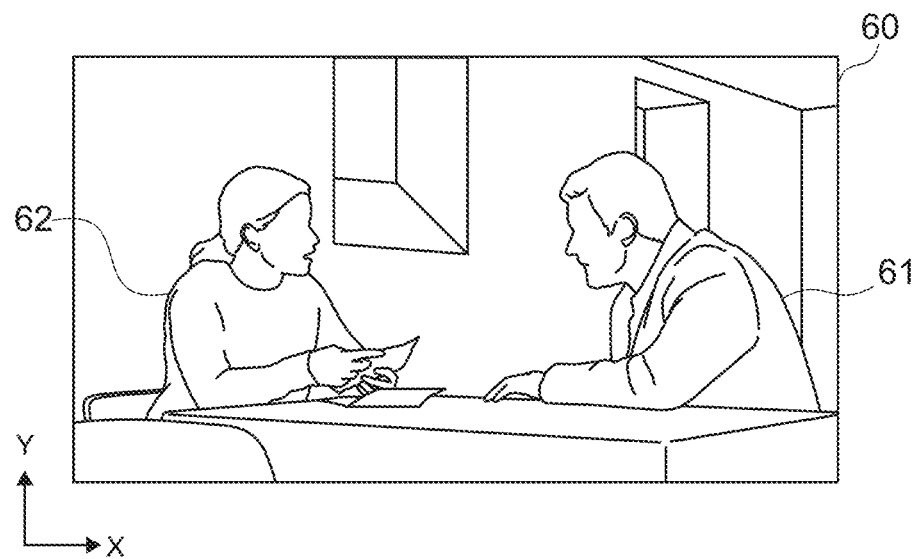
FIG. 2 is a diagram showing an example of an image of another location captured by a camera.
Figure 2:
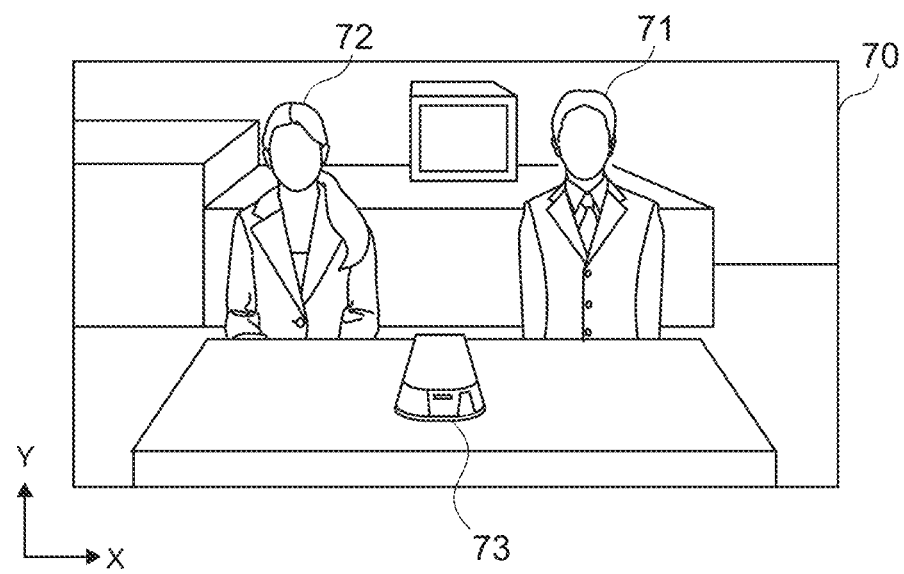

FIG. 2 is a diagram showing an example of an image of another location captured by the camera 31. A of FIG. 2 is an image of the 8th floor, and B of FIG. 2 is an image of the 9th floor. On the 8th floor, a conference is being carried out by persons 61 and 62. On the 9th floor, a presentation of a new product 73 is being carried out by persons 71 and 72.

FIGS. 3 to 7 are schematic diagrams each showing a generation example of a composite image 80. In this embodiment, a composite image is generated by the reproduction control unit 26 in the communication control apparatus 20 on the 7th floor. A composite image is an image that can provide a viewing experience as if the user on the 7th floor were simultaneously located on each of the 8th and 9th floors serving as the other locations. The user can obtain a virtual experience as if the user were simultaneously present on the 8th and 9th floors while being on the 7th floor.

An image 60 of the 8th floor and an image 70 of the 9th floor are output to the reproduction control unit 26 in the communication control apparatus 20 on the 7th floor via the communication control unit 27 and the communication control units 49.

Figure 3:
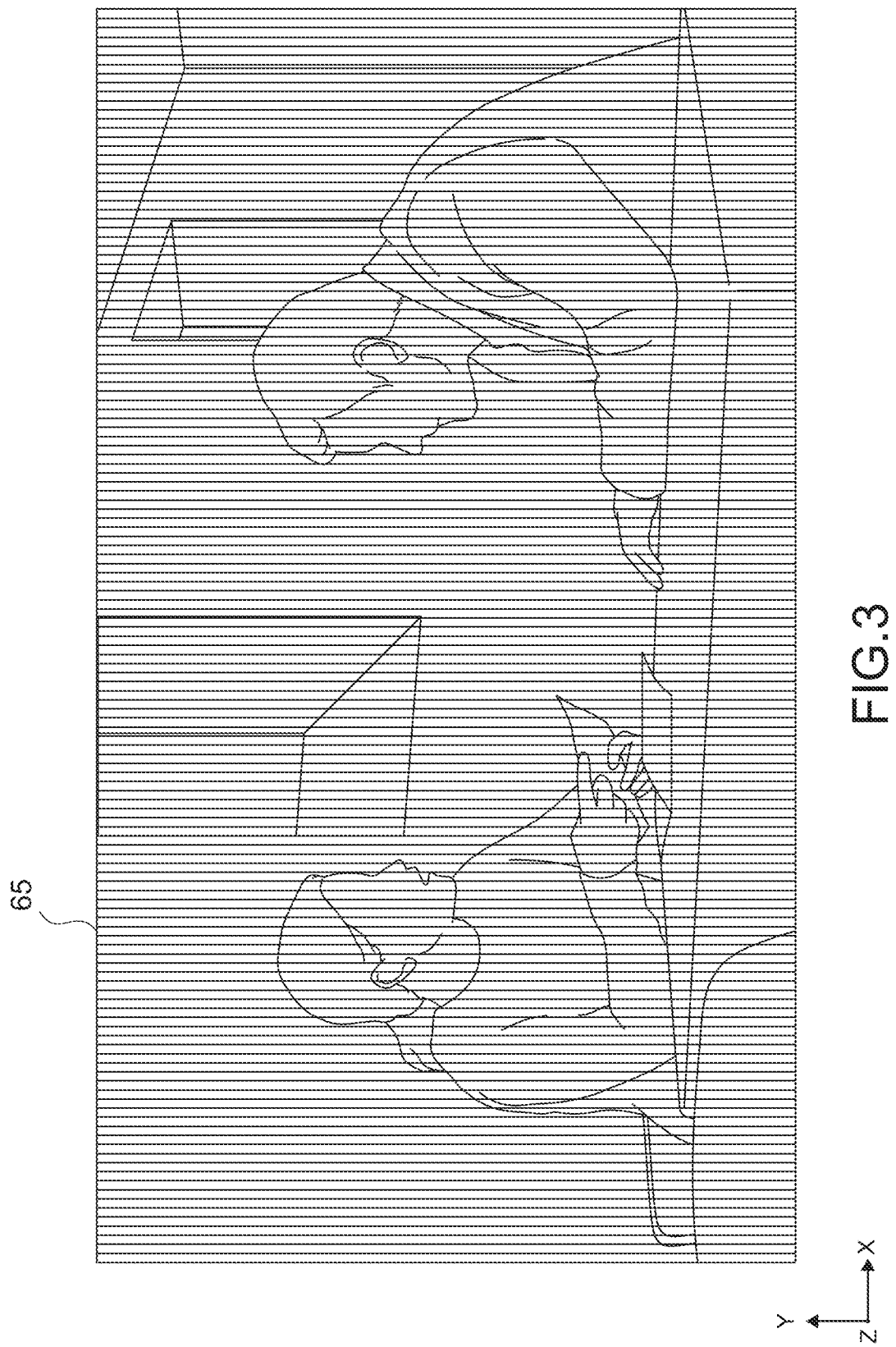
FIG. 3 is a schematic diagram showing a generation example of a composite image.

As shown in FIG. 3, the reproduction control unit 26 divides the image 60 of the 8th floor into a plurality of images along a direction (second direction) substantially perpendicular to a predetermined direction (first direction). The divided images are arranged in a predetermined direction. Here, the substantially perpendicular direction may be regarded as one corresponding to separation lines (boundary lines) for dividing the image.

In this embodiment, the image 60 of the 8th floor is divided into a plurality of images along the lateral direction (Y direction) of the image. The separation lines for dividing the image 60 of the 8th floor extend in the vertical direction (Y direction) of the image. Note that in this embodiment the display 13 is set such that the lateral direction of the image is the horizontal direction.

The image 60 of the 8th floor is divided at equal intervals along the horizontal direction (X direction). Therefore, the widths (size in horizontal walking) of the plurality of divided images (hereinafter, referred to as first divided images) 65 generated by the division are the same size.

Figure 4:
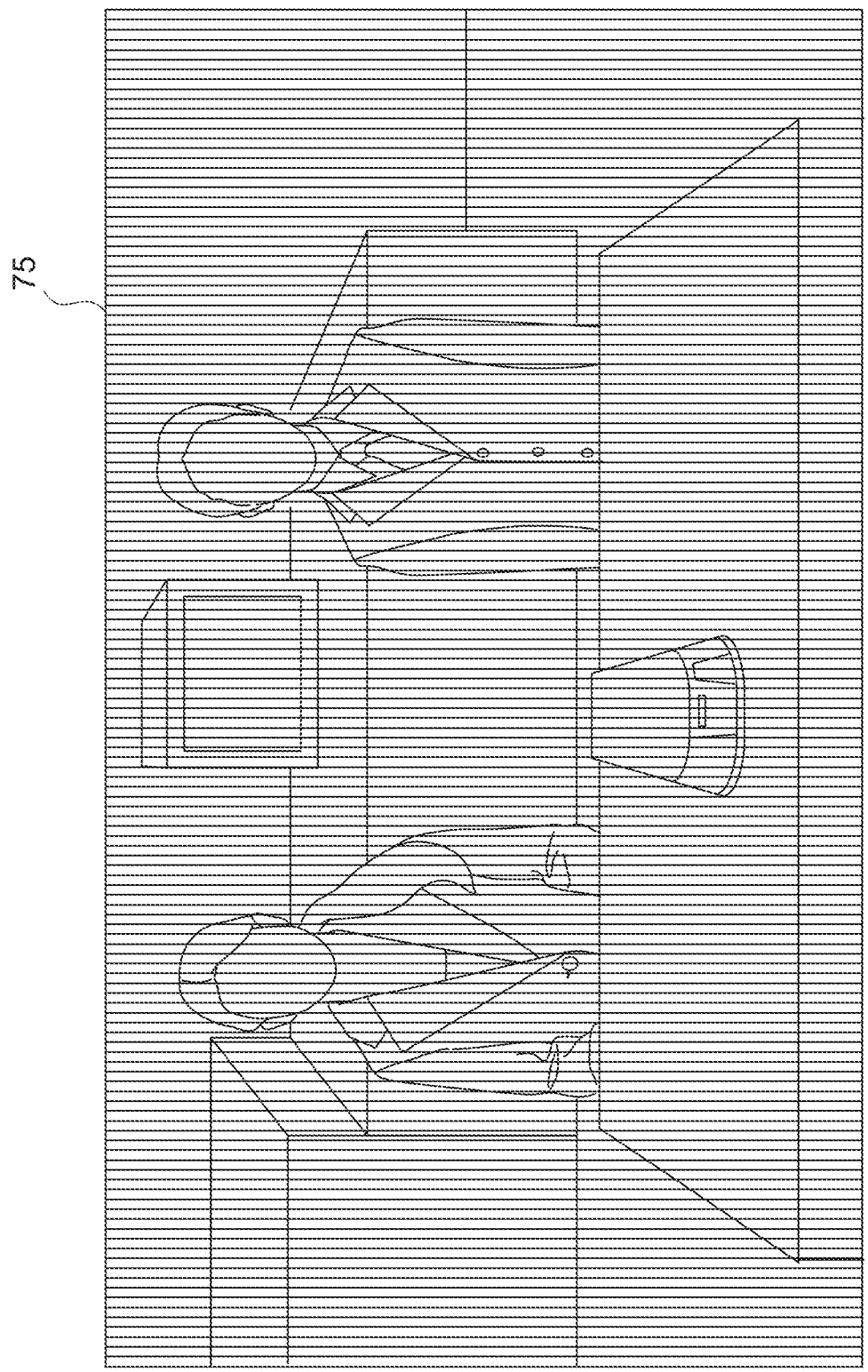
FIG. 4 is a schematic diagram showing a generation example of a composite image.

As shown in FIG. 4, the reproduction control unit 48 divides the image 70 of the 9th floor into a plurality of images along the perpendicular direction. In this embodiment, similarly to the image 60 of the 8th floor, the image 70 of the 9th floor is divided into a plurality of images along the perpendicular direction of the image.

The image 70 of the 9th floor is arranged at equal intervals in the horizontal direction. Therefore, the widths (size in horizontal walking) of the plurality of divided images (hereinafter, referred to as second divided images) 75 generated by the division are the same size. Further, the width of the first divided image 65 and the width of the second divided image 75 are set to be equal to each other.

The widths of the first divided image 65 and the second divided image 75 are not limited and may be arbitrarily set. For example, the widths of the first divided image 65 and the second divided image 75 are set in units of pixels. For example, the width of a portion of a place (coordinates) of the location where an important object such as a person exists may be reduced. Needless to say, the width is not limited thereto, and the width of the first divided image 65 and the width of the second divided image 75 may be set by a length of millimeters or the like.

Figure 5:
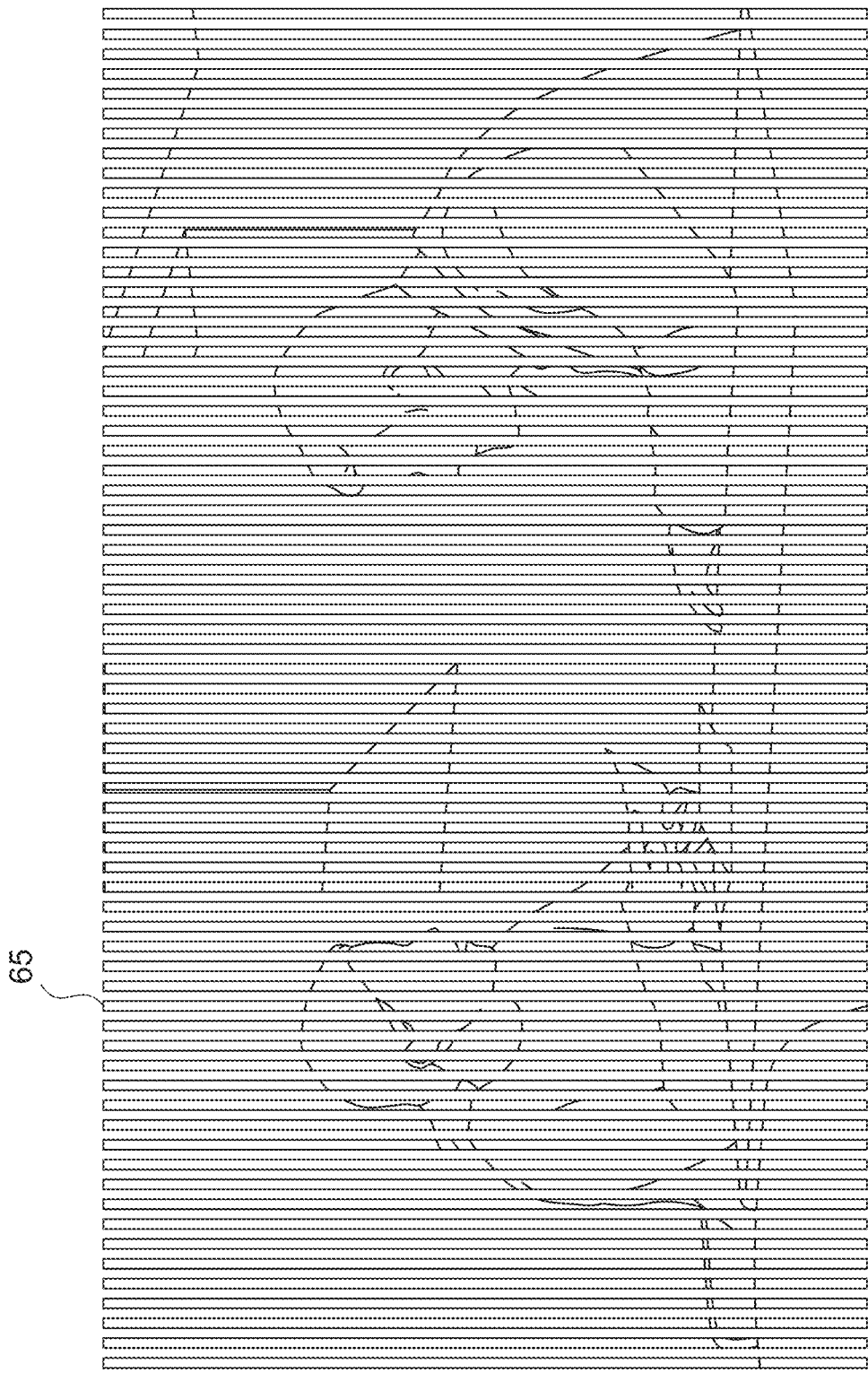
FIG. 5 is a schematic diagram showing a generation example of a composite image.
Figure 6:
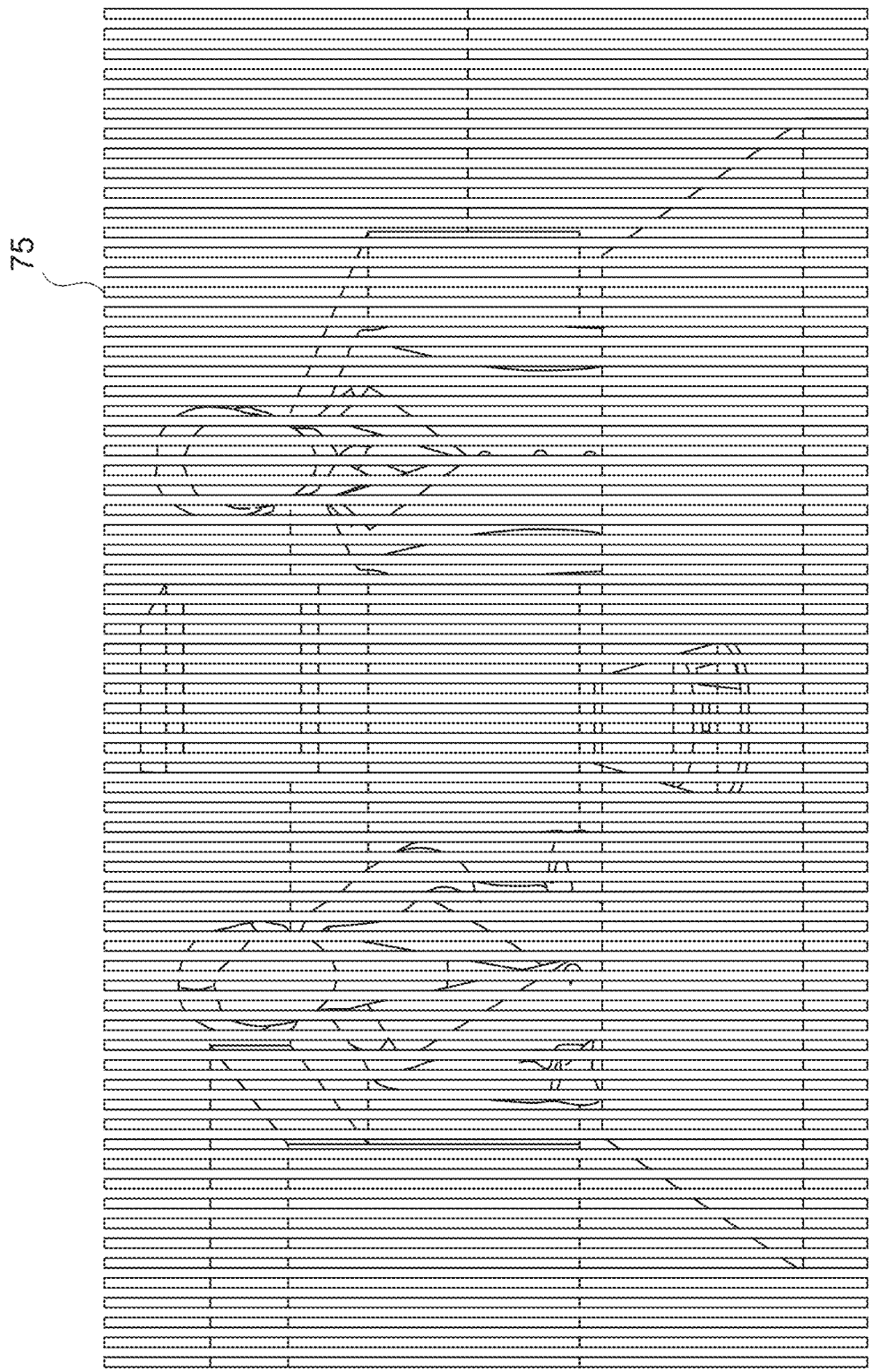
FIG. 6 is a schematic diagram showing a generation example of a composite image.

FIG. 5 is an image showing a state in which the odd-numbered first divided images 65 from the left side of the image are selected in the plurality of first divided images 65. FIG. 6 is an image showing a state in which the even-numbered second divided images 75 from the left side of the image are selected in the plurality of second divided images 75.

Figure 7:
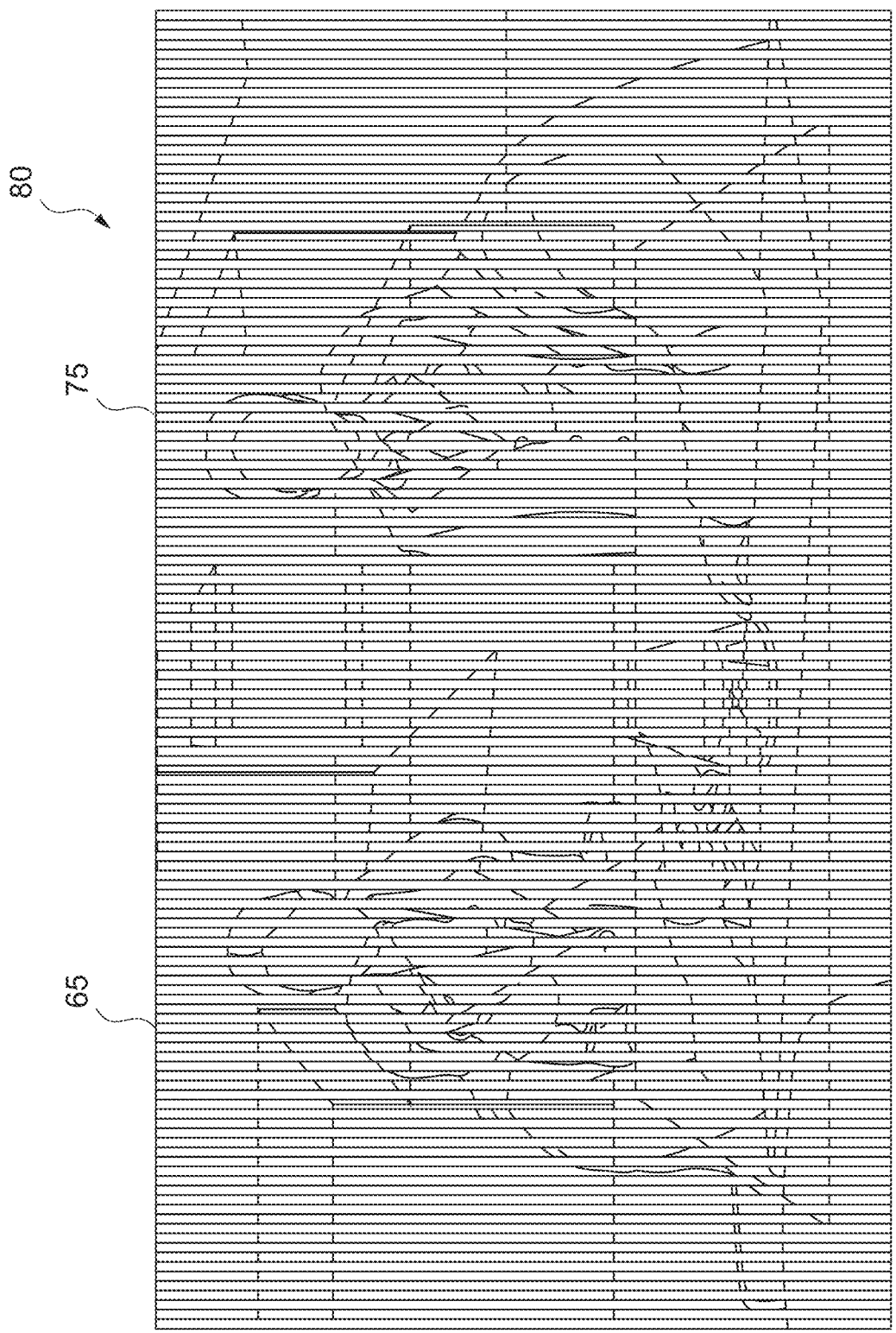
FIG. 7 is a schematic diagram showing a generation example of a composite image.

FIG. 7 is a schematic diagram showing an example of the composite image 80. The reproduction control unit 26 simultaneously displays the plurality of first divided images 65 shown in FIG. 5 and the plurality of divided images 75 shown in FIG. 6 on the display 13 of the user on the 7th floor along the horizontal direction which is a predetermined direction.

In this embodiment, the plurality of first divided images 65 and the plurality of divided images 75 are arranged and simultaneously displayed such that each of the plurality of second divided images 75 is sandwiched between the plurality of first divided images 65. That is, the composite image 80 is generated such that the first divided image 65 and the second divided image 75 are alternately arranged. Thus, a multiple simultaneous representation that allows a simultaneous experience of a plurality of locations, which will be described later, is achieved.

In this embodiment, the plurality of first divided images obtained by dividing the first image showing the first location along the perpendicular direction, and the plurality of second divided images obtained by dividing the second image showing the second location along the perpendicular direction are obtained by the reproduction control unit 26 functioning as an image obtaining unit.

Subsequently, the plurality of first divided images and the plurality of second divided images are arranged along the horizontal direction and simultaneously displayed on the display device of the user at the third location by the reproduction control unit 26 functioning as a display control unit.

The specific method for generating the composite image is not limited and may be arbitrarily set. That is, how the image 60 of the 8th floor is divided, how the plurality of first divided images 65 is selected, how the image 70 of the 9th floor is divided, how the plurality of second divided images 75 is selected, and how the plurality of first divided images 65 and the plurality of second divided images 75 are arranged may be arbitrarily set so as to achieve a desired multiple simultaneous representation.

For example, the division method along the predetermined direction for the image 60 of the 8th floor and the division method along the same direction for the image 70 of the 9th floor may be different methods. For example, the width, interval, and the like of the first divided image 65 may be different from the width, interval, and the like of the second divided image 75. Further, the first divided images 65 may have different widths, or the second divided images 75 may have different widths. For example, the floor image 60 or the floor image 70 may not be divided at equal intervals. Also, if there is no object of interest in the divided image, for example, there is no person, the display may not be performed. Further, for example, the width of each divided image may be controlled in accordance with the number of people in the image.

The arrangement of the plurality of first divided images 65 and the plurality of divided images 75 along a predetermined direction is also limited to the case of alternately arranging the images, and any arrangement may be employed.

Further, software image processing may be performed on the image data (pixel data) of the first divided images 65 and the second divided images 75. For example, the size, shape, color, contrast, direction, and the like of a person or an object displayed in the divided image may be appropriately changed by image processing. Various techniques may be performed so as to implement a desired multiple simultaneous representation using the composite image 80.

[Multiple Simultaneous Representation]

Several examples of the multiple simultaneous representation implemented by the composite image 80 will be described. FIGS. 8 to 12 are schematic diagrams for describing an example of the multiple simultaneous representation.

Figure 8:
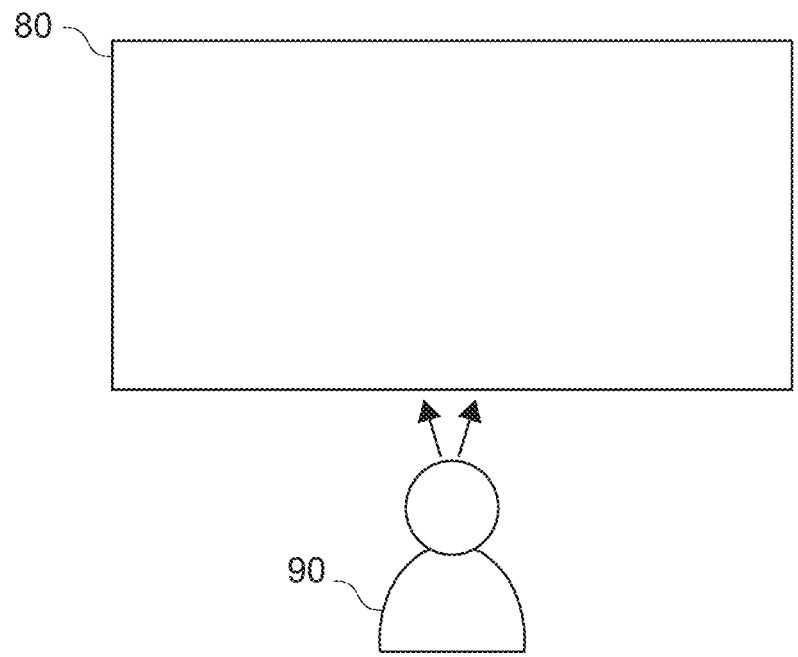
FIG. 8 is a schematic diagram for describing an example of a multiple simultaneous representation.

As shown in FIG. 8, it is possible to implement the multiple simultaneous representation in which the display of the 8th floor and the display of the 9th floor are switched to each other in accordance with a change in the line of sight of a user with respect to the display 13.

By switching the line-of-sight direction (angle of line of sight) with respect to the display 13, a user 90 can simultaneously obtain a virtual experience in which the user 90 is holding a conference with the persons 61 and 62 on the 8th floor and a virtual experience in which the user 90 is participating in the presentation by the persons 71 and 72 on the 9th floor.

Figure 9:
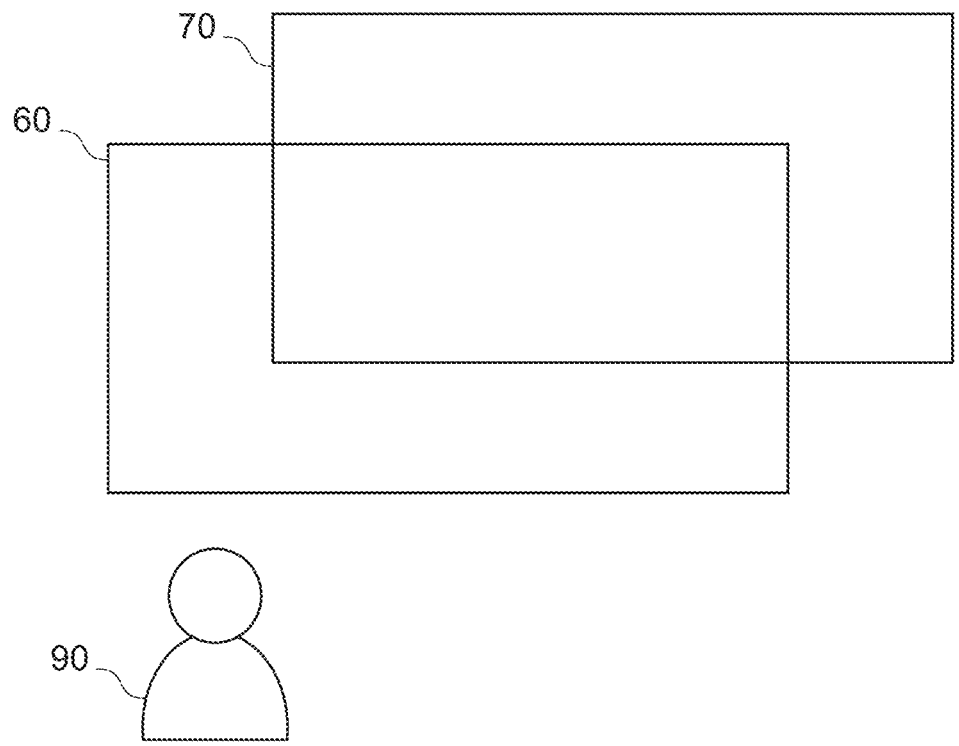
FIG. 9 is a schematic diagram for describing an example of a multiple simultaneous representation.

As shown in FIG. 9, it is possible to implement the multiple simultaneous representation in which the display position of the 8th floor and the display position of the 9th floor are different from each other in the depth direction when viewed from the user 90. For example, the scene of the conference on the 8th floor is displayed on the near side when viewed from the user 90. The scene of the presentation on the 9th floor is displayed on the far side (back side) in the depth direction. It is possible for the user to simultaneously experience the scene of the 8th floor and the scene of the 9th floor.

Figure 10:
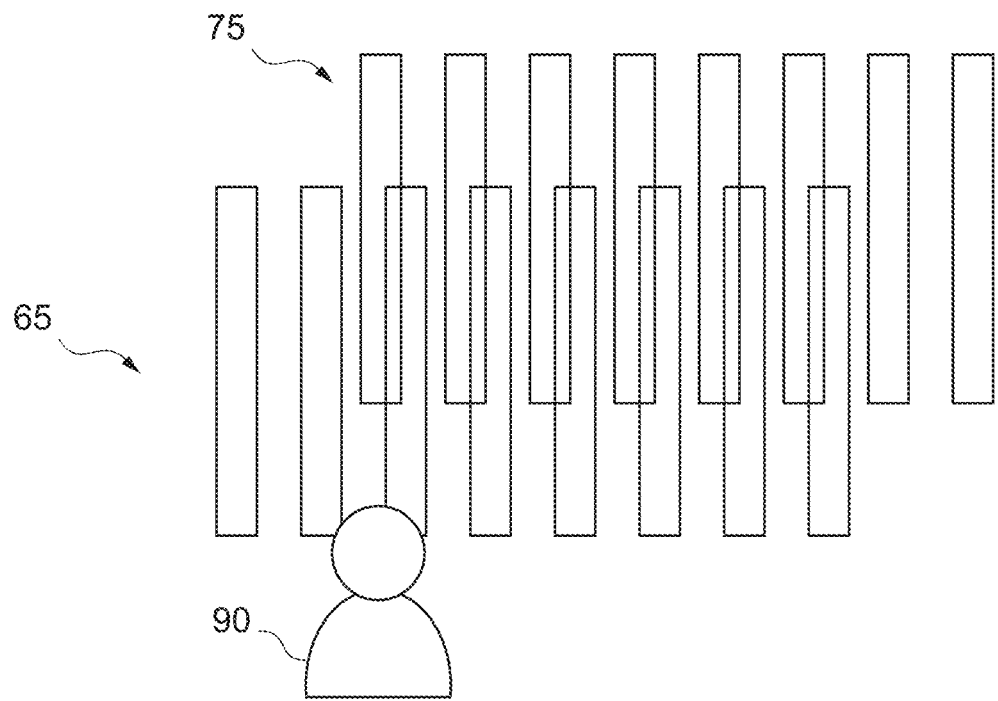
FIG. 10 is a schematic diagram for describing an example of a multiple simultaneous representation.

The multiple simultaneous representation shown in FIG. 10 correspond to the control of the display 13 such that the positions of the plurality of first divided images 65 and the plurality of second divided images 75 are made different from each other in the depth direction when viewed from the user 90.

For the user 90, the visibility of the plurality of first divided images positioned on the near side is higher. That is, the sensation of being on the 8th floor is stronger. Of course, the composite image 80 is generated such that the sensation of being on the 9th floor can also be provided at the same time. In this manner, it is also possible to generate the composite image 80 such that visibility is different between the plurality of first divided images 65 and the plurality of second divided images 75.

Of course, it is also possible to generate the composite image 80 such that the plurality of second divided images 75 is positioned on the near side and the plurality of first divided images 65 is positioned on the far side. In this case, the visibility of the plurality of second divided images 75 is higher for the user 90. Therefore, for the user, the sensation of being on the 9th floor is stronger. In this manner, it is possible to change the relative relationship of the visibility between the plurality of first divided images 65 and the plurality of second divided images 75.

Note that the image control processing for displaying the composite image 80 is not limited. For example, the plurality of first divided images 65 and the plurality of second divided images 75 may be arranged in a grid shape. Further, for example, the plurality of first divided images 65 and the plurality of second divided images 75 may be arranged so as to have different depths, and may be controlled so as to overlap with each other when viewed from the user.

Figure 11:
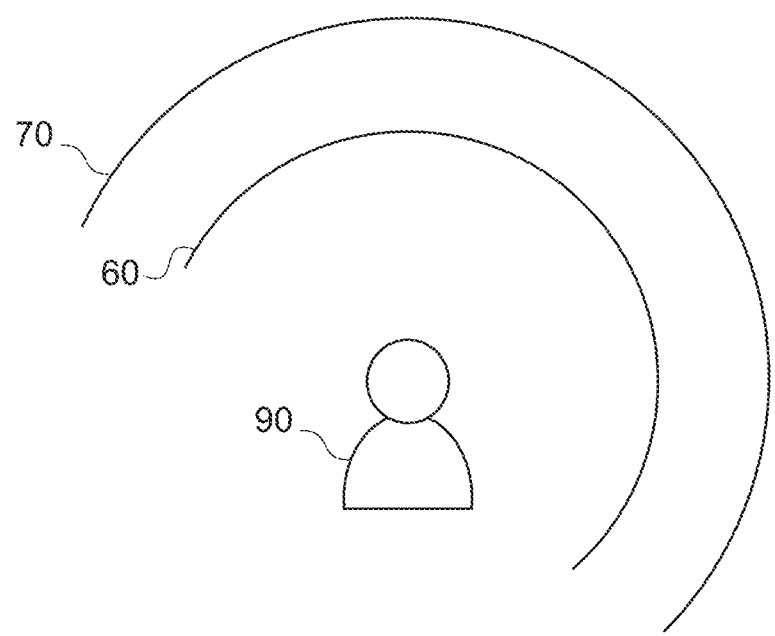
FIG. 11 is a schematic diagram for describing an example of a multiple simultaneous representation.

As shown in FIG. 11, when the camera 31 for capturing images of the locations on the 8th and 9th floors is a 360° camera or the like, the scene of the conference on the 8th floor and the scene of the presentation on the 9th floor, which constitute the composite image 80, may be displayed on the display 13 as an omnidirectional image.

Figure 12:
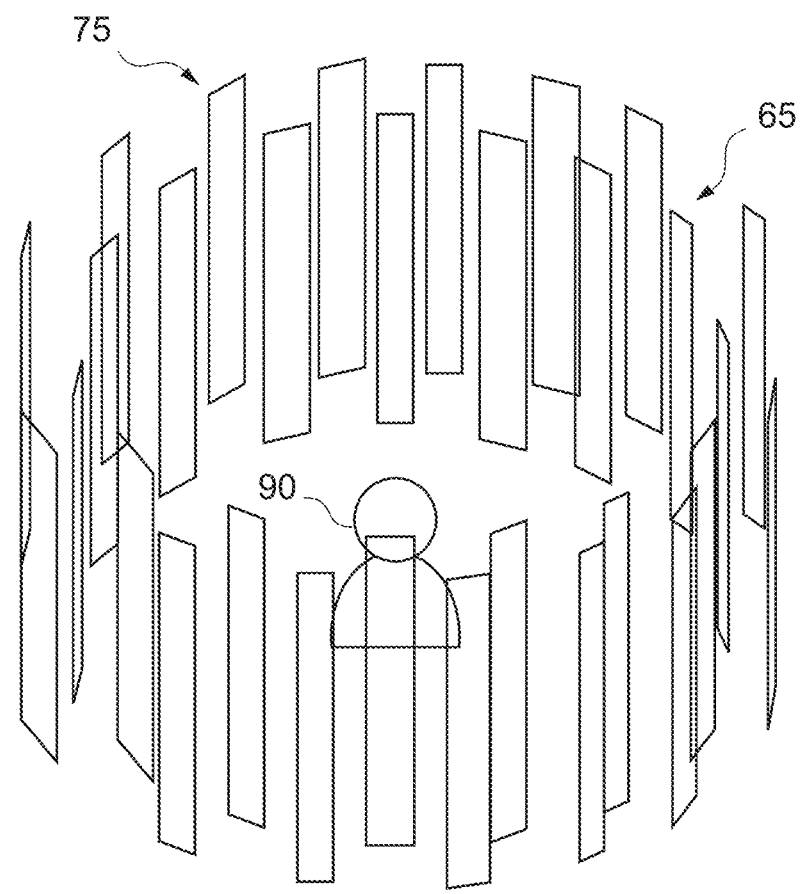
FIG. 12 is a schematic diagram for describing an example of a multiple simultaneous representation.

As shown in FIG. 12, in this embodiment, the reproduction control unit 26 controls the divided images of the plurality of second divided images 75 to be alternately seen between the divided images of the plurality of first divided images 65 obtained by dividing the image of the location of on the 8th floor.

If the image of the location is displayed around the user 90 like an omnidirectional image, the convergence distance of the user 90 is the distance from the center with the user 90 as the center. That is, the divided images of each location are controlled to appear on a circumference at a predetermined distance away from the user 90. Further, the interval between the divided images displayed on the circumference is an arc corresponding to the angle of the adjacent divided image when viewed from the user 90.

With reference to FIGS. 17A, 17B, 18, 19A, 19B, and 20, an example of a multiple simultaneous representation, i.e., providing composite images, is further supplemented. As shown in FIGS. 17A, 17B, 18, 19A, 19B, and 20, images of a plurality of spaces (floor images 660 and 670) are virtually arranged in the depth direction. Images for the left and right eyes are obtained by virtually capturing the arranged images of the spaces from a position offset horizontally so as to correspond to the average interval between the eyes of humans (about 6.5 cm). This may be regarded as a method substantially similar to a general stereo pair image generation method. The images of the spaces arranged at different positions in the depth direction (floor images 660 and 670) are respectively divided into divided images 665 and 675 as will be described later. An appropriate offset is provided between the divided image(s) 665 in the horizontal direction. Similarly, an offset is provided between the divided images 675. The offset of the divided images 665 and the offset of the divided images 675 are appropriately adjusted, so that the divided images 665 and the divided images 675 can be arranged so as to be simultaneously visible.

Note that it is determined which of the divided images 665 and 675 is an image fused by eyes 690 of the user 90 in accordance with the convergence angle of the eyes 690. One of the divided images that is not fused appears blurred to the user 90. That is, the user 90 can switch between a clearly visible space and a blurred space only by being aware of viewing a short distance or a long distance.

[Communication Operation Using Composite Image]

The communication operation using the composite image will be described. In this embodiment, the reproduction control unit 26 (48) controls the composite image 80 displayed on the display 13 of the 7th floor in accordance with a change in situation of at least one of the 7th, 8th, or 9th floor. A multiple simultaneous representation implemented by the composite image 80 is then appropriately changed. Note that one change in situation of at least one of the 7th, 8th, or 9th floor corresponds to a change in situation of at least one of the first location, the second location, or the third location.

For example, the reproduction control unit changes the relative relationship of visibility between the plurality of first divided images 65 and the plurality of second divided images 75 in the composite image 80. This makes it possible to control the intensity of the sensation of being on the 8th floor and the intensity of the sensation of being on the 9th floor.

That is, the visibility of the plurality of first divided images is made higher than the visibility of the plurality of second divided images, and thus it is possible to emphasize the sensation of being on the 8th floor. On the other hand, the visibility of the plurality of second divided images is made higher than the visibility of the plurality of first divided images, and thus it is possible to emphasize the sensation of being on the 9th floor.

In this embodiment, the relative relationship of visibility between the plurality of first divided images 65 and the plurality of second divided images 75 is changed on the basis of a change in motion and an utterance (change in sound) of the user 90 on the 7th floor. In addition, the relative relationship of visibility between the plurality of first divided images 65 and the plurality of second divided images 75 is changed on the basis of a change in motion and an utterance (change in sound) of the communication partners on the 8th and 9th floors.

For example, in response to a call from a communication partner on the 8th floor to the user 90, the reproduction control unit 26 increases the visibility of the plurality of first divided images 65 to be higher than the visibility of the plurality of second divided images 75, which are the other images.

For example, as illustrated in FIG. 9, it is assumed that the composite image 80 is generated such that the positions of the plurality of first divided images 65 and the plurality of second divided images 75 are different from each other in the depth direction when viewed from the user 90. In this case, the composite image 80 is controlled such that the plurality of first divided images 65 is arranged closer to the user 90 than the plurality of second divided images 75. That is, the composite image 80 is controlled so as to provide a multiple simultaneous representation in which the 8th floor on which the communication partner who has called is located is emphasized.

Of course, if a communication partner on the 9th floor calls the user 90, the visibility of the plurality of second divided images 75 is made higher than that of the plurality of first divided images 65.

The relative relationship of visibility between the plurality of first divided images 65 and the plurality of second divided images 75 may be changed in accordance with the change in posture of the user 90. For example, it is assumed that the user 90 looks in the plurality of first divided images 65 or the plurality of second divided images 75 in the composite image 80. The reproduction control unit 26 makes the visibility of the plurality of divided images, which corresponds to the floor of the images looked in, higher than the visibility of the other divided images in accordance with the looking-in motion of the user.

As shown in FIG. 7 and the like, in this embodiment, the plurality of first divided images 65 and the plurality of second divided images 75 are arranged along the horizontal direction and simultaneously displayed. Therefore, it is possible to determine the presence or absence of the looking-in motion of the user on the basis of the change in the posture of the user in the horizontal direction. Therefore, in this embodiment, the relative relationship of visibility between the plurality of first divided images 65 and the plurality of second divided images 75 is appropriately changed on the basis of the change in the posture of the user in the horizontal direction.

Further, as illustrated in FIG. 10, it is assumed that the composite image 80 is generated such that the positions of the plurality of first divided images 65 and the plurality of second divided images 75 are different from each other in the depth direction when viewed from the user 90. In this case, the relative relationship of visibility between the plurality of first divided images 65 and the plurality of second divided images 75 is changed on the basis of the change in the convergence distance of the user.

The convergence distance is a distance between a gaze point at which the user 90 is gazing and the user 90. For example, if the user 90 is gazing at the display 13, the convergence distance is substantially equal to the distance between the user 90 and the display 13.

The reproduction control unit 26 controls the display 13 such that a plurality of divided images corresponding to the convergence distance of the user 90 in the plurality of first divided images 65 and the plurality of second divided images 75 is arranged closer to the user 90 than the other plurality of divided images not corresponding to the convergence distance of the user 90 in the plurality of first divided images 65 and the plurality of second divided images 75. That is, the relative relationship of visibility between the plurality of first divided images 65 and the plurality of second divided images 75 is appropriately changed such that the display of the floor corresponding to the convergence distance of the user 90 is emphasized.

For example, it is assumed that the composite image 80 is generated such that the scene of the meeting on the 8th floor is positioned on the near side, and the scene of the presentation on the 9th floor is positioned on the back side. On the basis of the change in the convergence distance of the user 90, the reproduction control unit 26 increases the visibility of the image corresponding to the convergence distance, that is, the image in which the gaze point of the user 90 is located. For example, if the user 90 is viewing the scene of the presentation on the 9th floor, the composite image 80 is controlled such that the 9th floor is arranged close to the user.

Further, it is also possible to perform processing such that the visibility of the images at a location where a change in situation has occurred among the plurality of first divided images 65 and the plurality of second divided images 75 is made higher than the visibility of the other images. This makes it possible to quickly confirm the images of the floor in which the change in situation has occurred. In addition, the composite image 80 may be controlled in accordance with various change in situations of each floor of the 7th, 8th, or 9th floor. Any control method may be adopted as the control of the composite image corresponding to the change in situation.

Hereinafter, specific processing examples of the communication operation using the composite image 80 will be described with reference to FIGS. 13 to 16.

Figure 13:
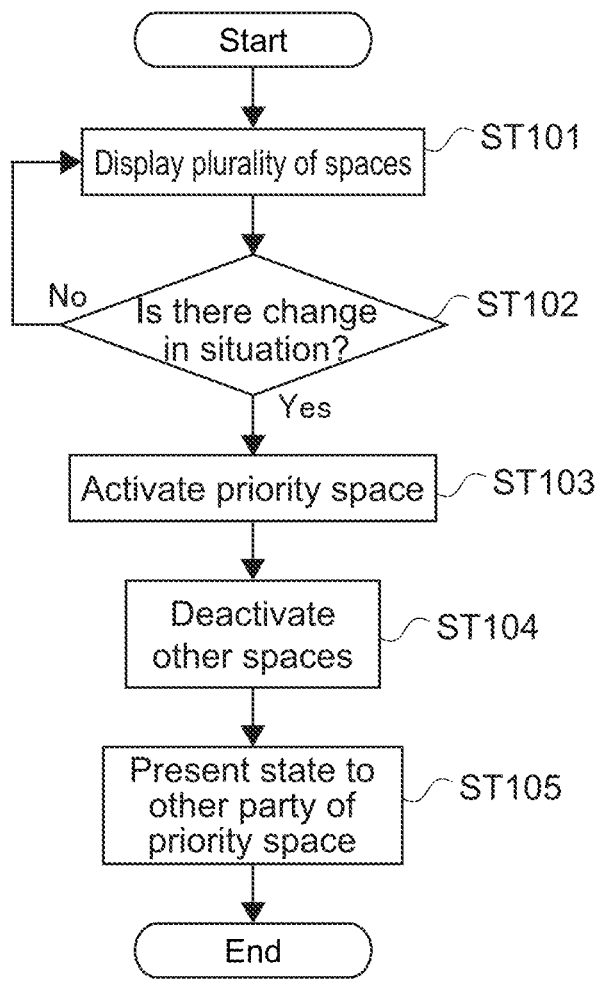
FIG. 13 is a flowchart showing control processing of emphasizing a specific location on the basis of a change in situation of a location.

FIG. 13 is a flowchart showing control processing of emphasizing a specific location on the basis of a change in situation of the location.

As shown in FIG. 7, when the locations of the 8th and 9th floors are being simultaneously displayed on the display 13 (Step 101), the user state recognition unit 25 and the environment recognition unit 45 determine whether or not there is a change in situation of a location at at least one of the location of the 8th floor, the location of the 9th floor, or the location where the user is present (Step 102).

The change in situation of the location includes at least one of a change in motion of a person or a change in sound emitted by a person at at least one of the location of the 8th floor, the location of the 9th floor, or the location where the user is present. Further, the change in situation of the location also includes a change in convergence distance of the user of the display 13. Examples of the change in situation of the location include the following: the user takes a particular posture and position such as looking in; the line of sight of the user stays at a particular location longer than a certain time period; and the convergence of the user stays at a certain depth position longer than a certain time period.

In addition, the following cases are exemplified: the fact that persons at the locations of the 8th and 9th floors perform specific actions or the like is obtained by the image input unit 41; and many sounds in animated conversations at the locations of the 8th and 9th floors are detected by the sound input unit 42. For example, when the user wants to know whether or not the construction work of the locations of the 8th and 9th floors is completed, the environment recognition unit 45 recognizes whether or not the construction sound (noise) of the location is present as the environment of the location.

If it is determined that there is a change in situation from the location of the 8th floor, the location of the 9th floor, and the location where the user is present (YES in Step 102), the reproduction control unit 26 activates the location where the change in situation is recognized to be a priority space (Step 103).

The activation includes at least one of the control of increasing the visibility of the priority space among a plurality of locations of the other party (8th and 9th floors) compared to the other locations, or the control of increasing the volume of a sound corresponding to the priority space. That is, the activation is the control of emphasizing a particular location.

As the examples of increasing the visibility, the reproduction control unit 26 displays the image of the priority space in the composite image 80 displayed on the display 13 on the near side, displays the image in a dense color, and increases the brightness. In addition, locations other than the priority space may be hidden.

As the examples of the sound control, the sound output unit 24 controls the speaker 14 to change the relative relationship between the sound output of the 8th floor corresponding to the image of the 8th floor and the sound output of the 9th floor corresponding to the image of the 9th floor in accordance with the change in the relative relationship of visibility. That is, the sound output unit 24 outputs a large sound corresponding to the priority space to the speaker 14.

In addition, the sound output unit 24 makes the sound output corresponding to one of the divided image 65 of the 8th floor and the divided image 75 of the 9th floor, which has high visibility, larger than the sound output corresponding to another one of the divided image 65 of the 8th floor and the divided image 75 of the 9th floor. In addition, a small sound corresponding to another location may be output, or a sound corresponding to another location may not be output.

The control of reducing the visibility of other locations other than the priority space, and the control for other locations, such as control of reducing the volume of a sound corresponding to other locations, to facilitate the user's recognition of the priority space can also be referred to as deactivation. Further, the deactivation includes stopping the output of the image and sound on the user side to the display 33 and the speaker 34 on the other party side. For example, when the 8th floor becomes the priority space, the display 33 and the speaker 34 of the 9th floor, which is another location, are in a state where the state of the user side cannot be confirmed.

Note that the method of controlling the activation and deactivation is not limited. For example, as the deactivation for an image of another location, images of a plurality of other locations may be controlled in a two-dimensional layer in which the images are compressed and superimposed at the same position in depth.

The reproduction control unit 26 deactivates the other locations at the same time that the priority space is activated (Step 104). In addition, a notification indicating that the location of the other party has been changed into the priority space from the user is presented to the other party in the priority space in which a change in situation occurred (Step 105). For example, the user's face or a text indicating that the location of the other party has been changed into the priority space is displayed on the display 33 of the other party. Further, for example, a notification sound or the like may be output to the speaker 34 of the other party.

Figure 14:
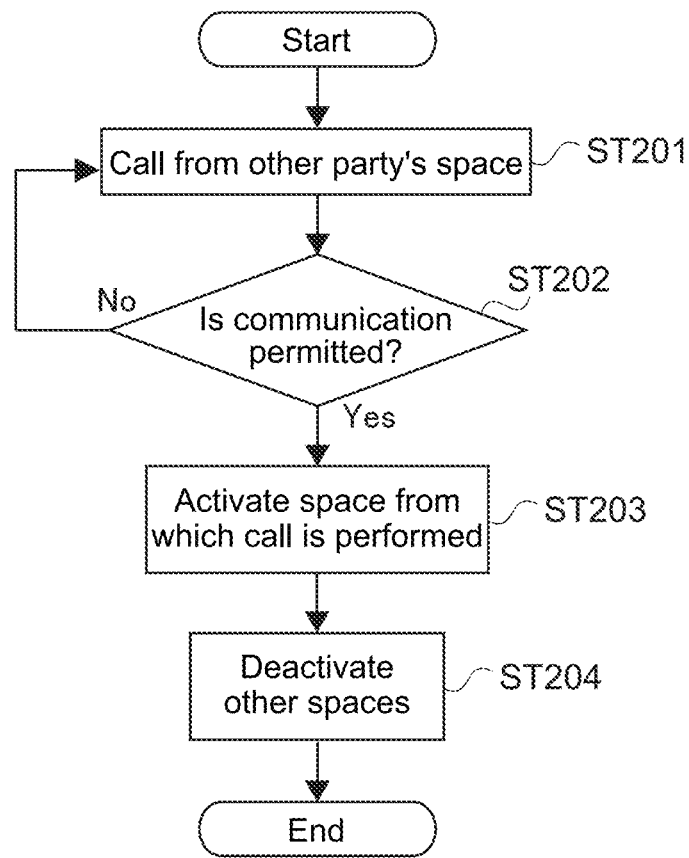
FIG. 14 is a flowchart showing control processing of emphasizing a specific location in response to a call from the other party.

FIG. 14 is a flowchart showing control processing of emphasizing a specific location in response to a call from the other party side.

It is assumed that a person on the 8th floor or the 9th floor calls when the user is simultaneously experiencing the 8th and 9th floors as the other locations of the other party side (Step 201). Specifically, the microphone 32 of the other party side obtains voice of a person on the other party side. The utterance analysis unit 46 analyzes whether or not the obtained voice is a call to the user. The utterance analysis unit 46 supplies the analysis result to the reproduction control unit 26 via the communication control unit 49. At this time, a notification to inform the user of the location from which communication has been requested may be output to the display 13 or the speaker 14.

In this case, the user state recognition unit 25 determines whether or not the user permits communication with the other party in response to the call from the other party (Step 202). For example, the user permits communication with the location of the other party from which the call has been made by pressing a button that permits communication, performing a specific motion such as nodding, or making an utterance to permit communication, for example (YES in Step 202).

Similarly, when communication is not permitted, the user can reject communication with the location of the other party from which the call has been made by pressing a button that does not permit communication, performing a specific motion such as swinging the head horizontally, or making an utterance to reject communication, for example (NO in Step 202). At this time, a notification indicating that communication has been rejected may be output to the display 33 of the other party.

Note that the action to permit communication, the action to reject communication, and the calling action of the other party are not limited. For example, even if a particular action such as eye contact is performed by a person at the location of the other party, a notification to inform the user of the location from which communication has been requested may be output.

If the user permits communication with the location of the other party (YES in Step 202), the reproduction control unit 26 sets the location from which the call has been made as a priority space, and actives the location (Step 203). Further, the reproduction control unit 26 deactivates locations other than the priority space (Step 204).

For example, in the activation and deactivation when communication is performed, images and sounds of other locations are not output to the display 13 and speaker 14. That is, only the images and sounds of the priority space are output to the display 13 and the speaker 14.

If the user does not want a person at another location to know the contents of the conversation or the like when the user communicates with a specific location of the other party, the images and sounds on the user side may be stopped from being output to the display 33 and the speaker 34 of the other party.

Specifically, the signal of deactivation from the reproduction control unit 26 is supplied to the reproduction control unit 48 of another location. As a result, the display 33 and the speaker 34 stop outputting the scene of the conversation between the user and the person in the priority space.

Figure 15:
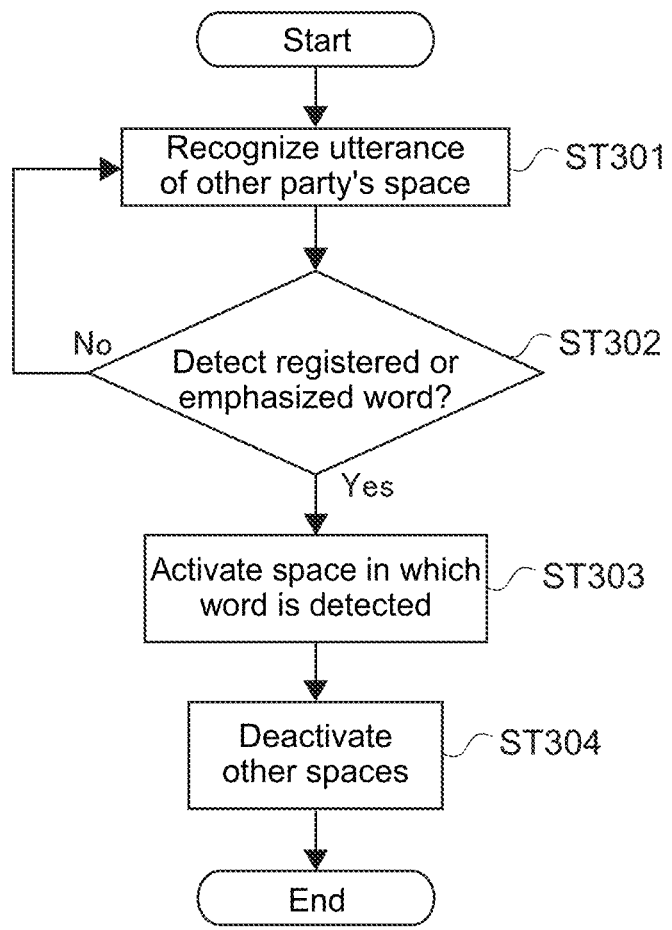
FIG. 15 is a flowchart showing control processing of emphasizing a specific location on the basis of a registered or emphasized word.

FIG. 15 is a flow chart showing control processing of emphasizing a particular location on the basis of a registered or emphasized word.

The sound input unit 42 obtains, from the microphone 32, the contents of the utterance being performed on the 8th floor or the 9th floor as the locations of the other party (Step 301). The utterance analysis unit 46 determines whether the contents of the utterance obtained by the sound input unit 42 include a word registered in the person/object registration DB 50 or an emphasized word (Step 302).

The emphasized word is, for example, a word whose intonation emphasized more than usual is detected in the contents of the utterance of the other party, a frequently appearing word that is detected many times in the utterance, or the like.

If a word registered in the person/object registration DB 50 or an emphasized word is detected (YES in Step 302), the location in which the word is detected is activated as a priority space (Step 303). Further, the reproduction control unit 26 deactivates locations other than the priority space (Step 304).

For example, in the activation and deactivation when a word is detected, images of other locations are not displayed on the display 13, and the utterances from other locations are displayed as text on the display 13.

That is, the reproduction control unit 26 causes the display 13 to display an image in which the sound output corresponding to a plurality of divided images having lower visibility between the plurality of divided images of the 8th floor and the plurality of second divided images of the 9th floor is converted into text. Note that the contents of the text are not limited. For example, all utterances may be displayed as text, or only the registered words or emphasized words may be displayed.

Figure 16:
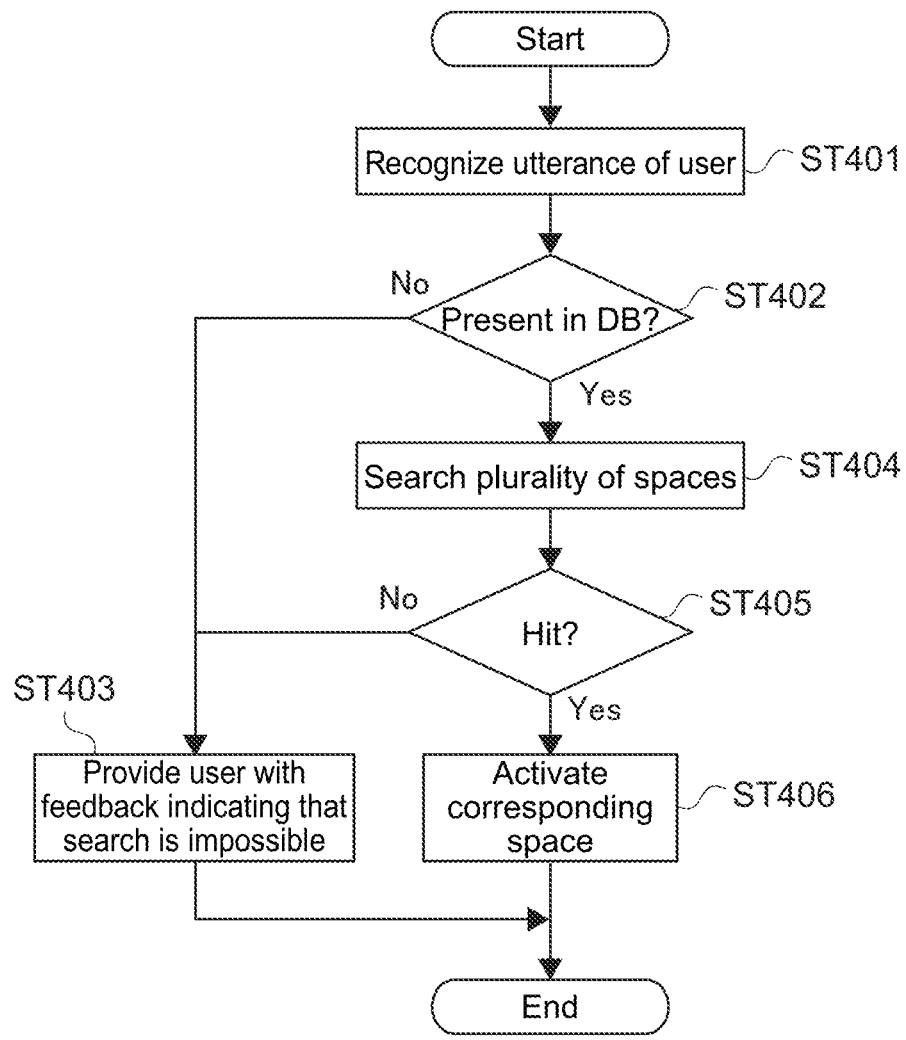
FIG. 16 is a flowchart showing control processing of emphasizing a location corresponding to a search.

FIG. 16 is a flowchart showing control processing of emphasizing a location corresponding to a search.

When the user searches for a specific person or object using the communication control apparatus 20, the user says, "Where is the manager?" to the microphone 12 (Step 401).

The user state recognition unit 25 recognizes that the user is looking for the manager from the user's utterance obtained by the sound input unit 22. The person/object detection unit 47 searches the person/object registration DB 50 for the manager (Step 402).

If the manager is not registered in the person/object registration DB 50 (NO in Step 402), the reproduction control unit 26 outputs, to the user, information indicating that the information of the manager is not registered in the person/object registration DB 50. That is, the search result indicating that the search is not possible for the search requested by the user is fed back to the user (Step 403).

If the manager is registered in the person/object registration DB 50 (YES in Step 402), the person/object detection unit 47 searches for the location where the manager is present in the images of the plurality of locations obtained by the image input unit 41 (Step 404). The person/object detection unit 47 determines whether or not there is a corresponding person recognized as the manager in the location where the camera 31 is installed (Step 405). For example, the person/object detection unit 47 recognizes a person in the image as the manager when the reliability indicating how much the person in the image matches the information of the manager registered in the person/object registration DB 50 exceeds a threshold.

If there is a corresponding person (YES in Step 405), the reproduction control unit 26 actives the location of the corresponding person as a priority space (Step 406). For example, in the activation of the corresponding location, the visibility of the image of the priority space is made larger than the visibility of an image of another location, and the corresponding person is enhanced and displayed on the display 13. That is, the reproduction control unit 26 increases the visibility of the location where the corresponding person is present, and at the same time, displays the corresponding person in a large size, or attaches a predetermined marker or the like thereto, to make the corresponding person easy to be recognized by the user.

If there is no corresponding person (NO in Step 405), the reproduction control unit 26 outputs, to the user, information indicating that the information of the manager is not registered in the person/object registration DB 50 (Step 403).

As described above, in the intercommunication system 500 according to this embodiment, the divided images 65 of the 8th floor, which are obtained by dividing the image of the 8th floor showing the location of the 8th floor along the perpendicular direction, and the divided images 75 of the 9th floor, which are obtained by dividing the image of the 9th floor showing the location of the 9th floor along the perpendicular direction, are obtained. The divided images 65 of the 8th floor and the divided images 75 of the 9th floor are simultaneously displayed side by side along the horizontal direction on the display 13 at the location where the user 90 is present. This makes it possible to provide a high-quality viewing experience.

In virtual reality (VR), augmented reality (AR), an omnidirectional image as a live-action image, or the like, the user can experience movement to a virtual location or another location. However, it has been difficult for a user to experience the simultaneous presence in multiple locations, even though the user can experience movement to a single location.

In this regard, in the present technology, the divided images of a plurality of locations are displayed in a striped pattern. The displayed images or sounds corresponding to the locations are controlled on the basis of the posture, line of sight, or the like of the user, so that the location with which communication can be interactively performed is switched. This makes it possible to provide a high-quality viewing experience.

Since the images and sounds of the plurality of locations are output at the same time, the user can simultaneously feel the presence of the plurality of locations. Further, the communication with the plurality of locations is emphasized and displayed under various conditions, thus making it easier to know the locations that the user wants to watch.

Other Embodiments

The present technology is not limited to the embodiments described above, and can achieve various other embodiments.

In the above embodiments, the sounds from other locations are displayed as text on the display 13. The present technology is not limited to this. The utterance of the priority space may be displayed as text on the display 13. That is, the user can recognize the utterance corresponding to the priority space as sound and text.

In the above embodiments, the images of a plurality of locations of the other party are simultaneously displayed on the display 13 on the user side. The present technology is not limited to this. When there is a location where there is no person in a plurality of locations of the other party, only the location where there is a person may be displayed on the display 13. Further, it may also be possible to make a setting to display a specific location at all times. Furthermore, a location other than a specific location may be displayed on the basis of whether or not a person enters or leaves or the presence/absence of a person. For example, an image of the location of the 8th floor is constantly displayed on the display 13, and an image of a location of the 9th floor is displayed only when there is a person.

In the above embodiments, the location where the person retrieved by the user is located is activated. The present technology is not limited to this. If the user retrieves a specific person, the location of the specific person may be tracked and activated. For example, when a specific person on the 8th floor moves to the 9th floor, the reproduction control unit 26 outputs, to the display 13, an image in which the location of the 8th floor is deactivated and the location of the 9th floor is activated.

In the above embodiments, the location of the user side and the location of the other party are displayed on the display 13. The present technology is not limited to this. An image of a location on his/her own side (a person on the user side or the other party side) may be displayed on the display 13. For example, the image of the user side may be displayed by picture-in-picture (PIP) on the display 13 on the user side. Further, when the user or a person on the other party side uses a device capable of a virtual experience, such as an HMD, the shootable range of the camera may be displayed as a virtual line at the virtual location.

Further, in the above embodiments, sounds of the location on the user side and the location on the other party side are output to the speaker 14. The present technology is not limited to this. Only the sounds generated from the shootable range of the camera 11 may be output. Conversely, only the range in which sounds are generated within a location may be displayed on the display 33. Further, for example, when the user or a person on the other party side moves, the output of the sound may be corrected on the basis of the distance or the like from the camera 11 (31).

In the above embodiments, the user and the person at the location on the user side and at the location on the other party side are displayed on the display 13. The present technology is not limited to this. Any avatars may be displayed instead of the user and the person in the actual image. Alternatively, a past image or the like of the user and the person may be displayed instead of avatars.

In the above embodiments, a search for a person is performed. The present technology is not limited to this. A search for a cart or the like used in a company may be performed. For example, an image of the cart may be registered in the person/object registration DB 50, or image recognition may be performed by tagging the cart.

In the above embodiments, the priority space is activated on the basis of a change in situation or the like. The present technology is not limited to this. For example, if a sound corresponding to a location is moved to the left or right and the line of sight of the user follows the movement, the location where the sound is generated may be activated as the priority space.

In the above embodiments, the camera 11 obtains an image of the location, and the reproduction control unit 26 divides the image into strips. The present technology is not limited to this, and only a group of divided images to be displayed on the display 13 may be obtained.

Figure 17A:
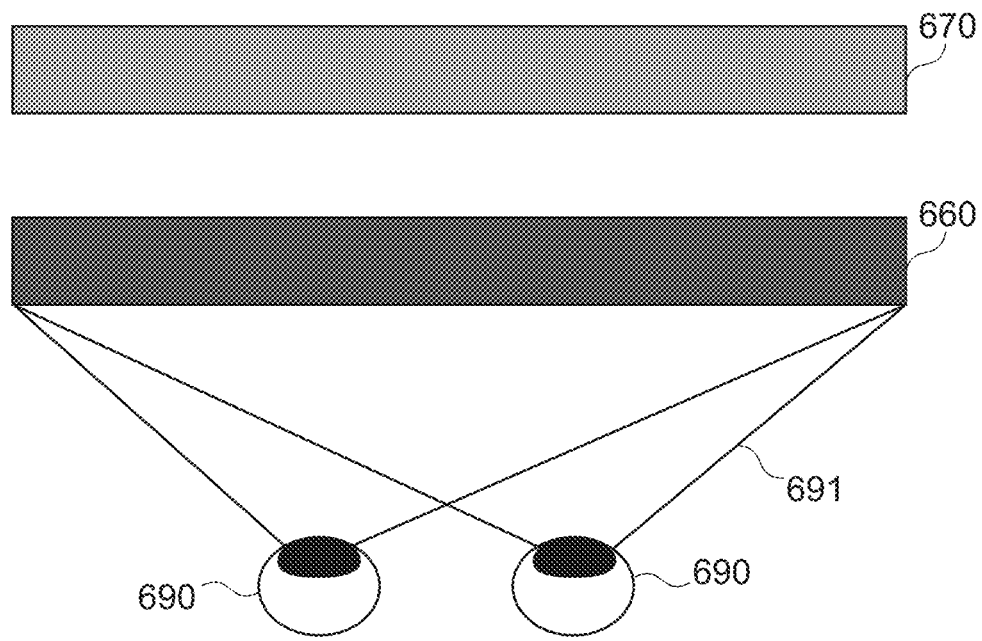
FIGS. 17A and 17B is a are schematic diagrams schematically showing an example of a display method for preventing blocking.
Figure 17B:
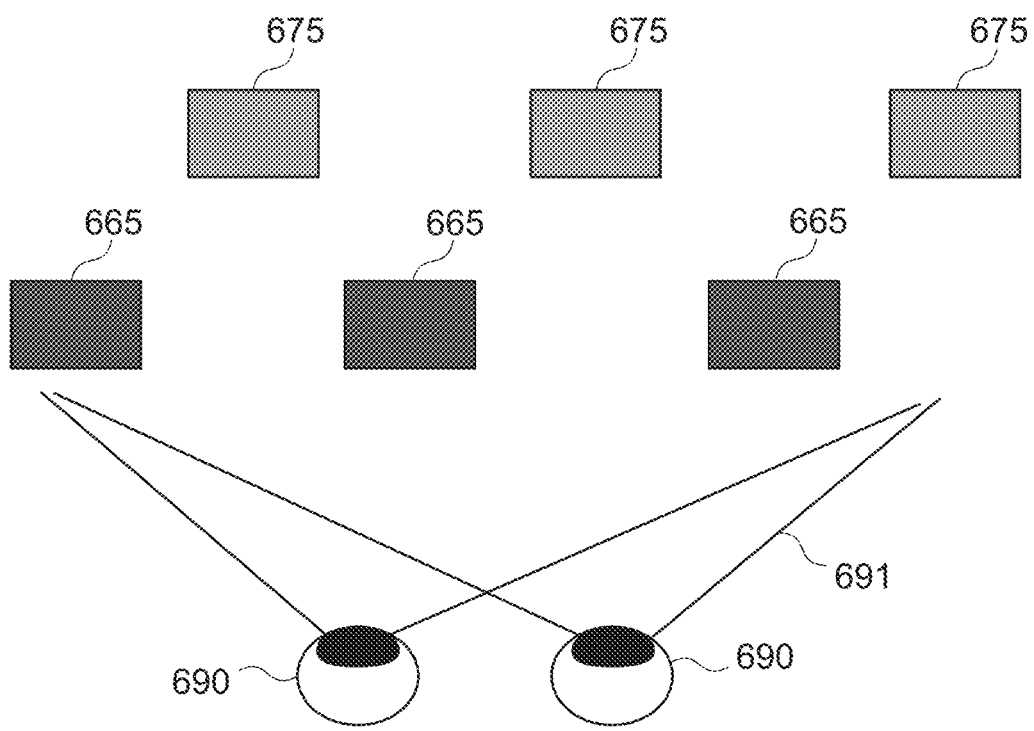

FIGS. 17A and 17B are schematic diagrams schematically showing a composite image according to another embodiment. FIG. 17A is a schematic diagram schematically showing a state in which the user views the images of the 8th and 9th floors at differ depths. FIG. 17B is a schematic diagram schematically showing a display method for the user to view the images like a composite image. In the following description, description of configurations and operations similar to those of the intercommunication system 500 described in the above embodiments will be omitted or simplified.

As shown in FIG. 17A, the eyes of the user 690 are viewing a composite image, i.e., an image 650 of the 8th floor and an image 670 of the 9th floor within a field of view 691 of the user 690. That is, the user 690 is viewing a composite image in which the depth directions of the 8th and 9th floors are different. In this embodiment, only a part of the field of view 691 is shown in the figure to indicate the position at which the user wants to gaze.

Consider the case where the objects displayed in the image 660 of the 8th floor and the image 670 of the 9th floor are dense when the composite image is displayed. As shown in FIG. 17B, the reproduction control unit 26 changes the image 660 of the 8th floor and the image 670 of the 9th floor into a strip shape and outputs them to the display 13 such that divided images 665 of the 8th floor and divided images 675 of the 9th floor do not overlap each other. As a result, the user 690 can view a composite image that allows the user to simultaneously experience the locations of the 8th and 9th floors.

Figure 18:
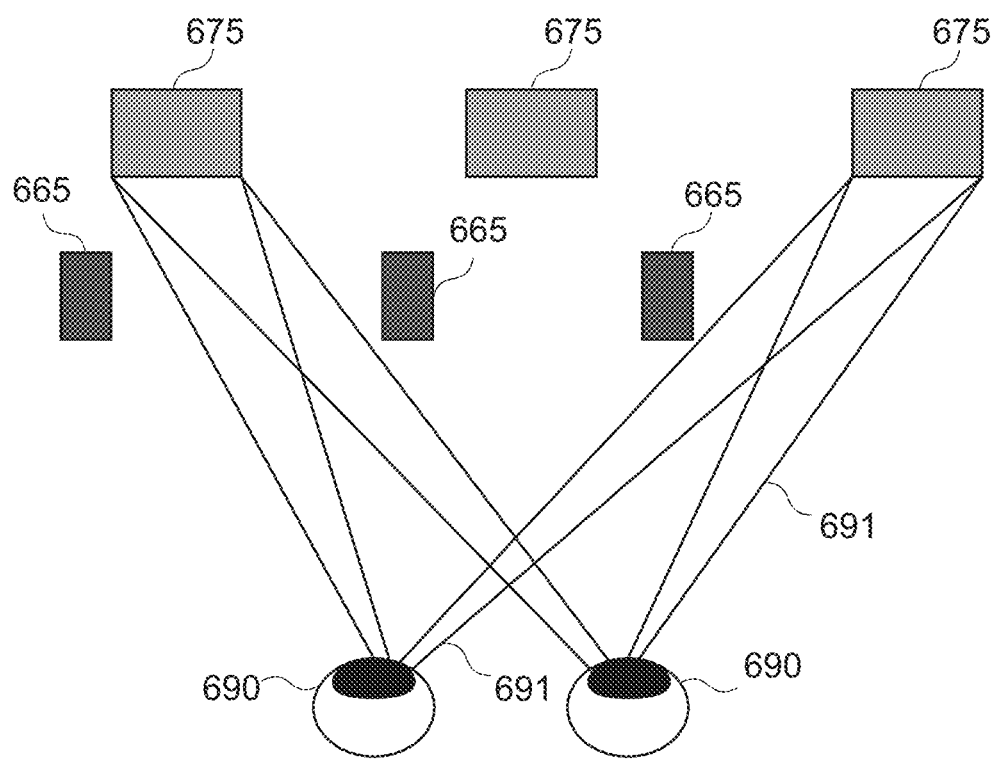
FIG. 18 is a schematic diagram schematically showing an example of a display method for preventing blocking.

FIG. 18 is a schematic diagram schematically showing an example of a display method for preventing blocking.

As shown in FIG. 18, the user 690 is gazing at the divided images 675 of the 9th floor. That is, the distance in the depth direction from the eyes of the user 690 to the divided images 675 of the 9th floor matches the convergence distance of the eyes of the user 690. In this case, blocking may occur due to the divided images 665 of the 8th floor on the near side. The blocking means that part of the divided image blocks the field of view 691 of the user 690, and thus part of the divided image of the floor at which the user 690 is gazing is not visible.

As a method of preventing the blocking, the reproduction control unit 26 controls the width of the divided image 665 of the 8th floor to be narrow. Further, the reproduction control unit 26 controls the width of the divided image 675 of the 9th floor to be wide. That is, the reproduction control unit 26 performs control to increase the width of the divided image of the location at which the user is gazing, and reduces the width of the divided image of the location in front of the location at which the user is gazing. As a result, it is possible to prevent the field of view 691 from being blocked.

In addition, when the divided image of the location on the near side is narrowed, the reproduction control unit 26 controls the width of the divided image by deleting a position where there is no important person or object in the image of the location on the near side, or compressing the entire aspect ratio, for example.

Figure 19A:
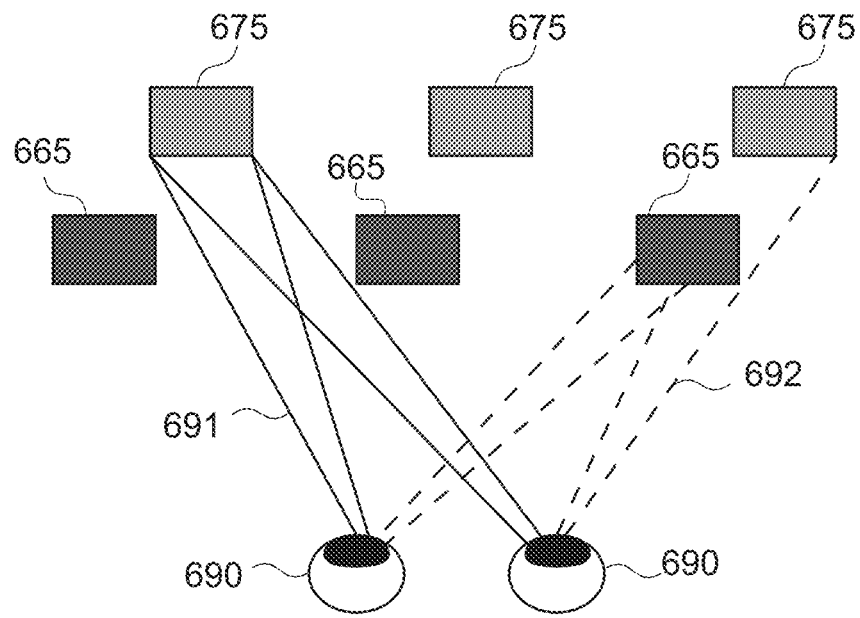
FIGS. 19A and 19B is a are schematic diagrams schematically showing another example of a display method for preventing blocking.
Figure 19B:
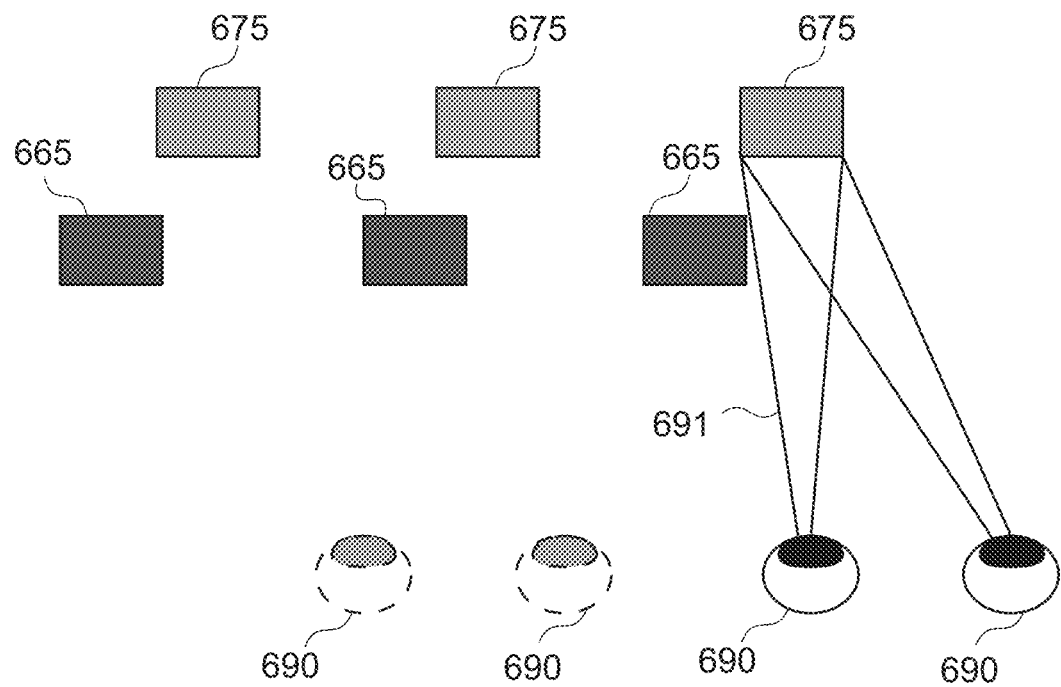

FIG. 19 is a schematic diagram schematically showing another example of a display method for preventing blocking. FIG. 19A is a schematic diagram schematically showing a state in which the divided image 675 of the 9th floor is blocked when viewed from the user 690. FIG. 19B is a schematic diagram schematically showing a state in which the eyes (viewpoint) of the user 690 are shifted.

As shown in FIG. 19A, a field of view 692 of the user 690 is blocked by part of the divided image 665 of the 8th floor. In this case, the eyes of the user 690 fail to view part of the divided image 675 of the 9th floor. As a method of preventing blocking without narrowing the widths of the divided images in the location on the near side, as shown in FIG. 19B, the eyes of the user 690 indicated by dashed lines are positions in FIG. 19A. The reproduction control unit 26 controls the display at a position where the divided image 675 of the 9th floor becomes visible even if it is blocked when the user 690 moves the viewpoint. That is, control may be performed such that the image becomes visible when the user 690 changes the posture.

Figure 20:
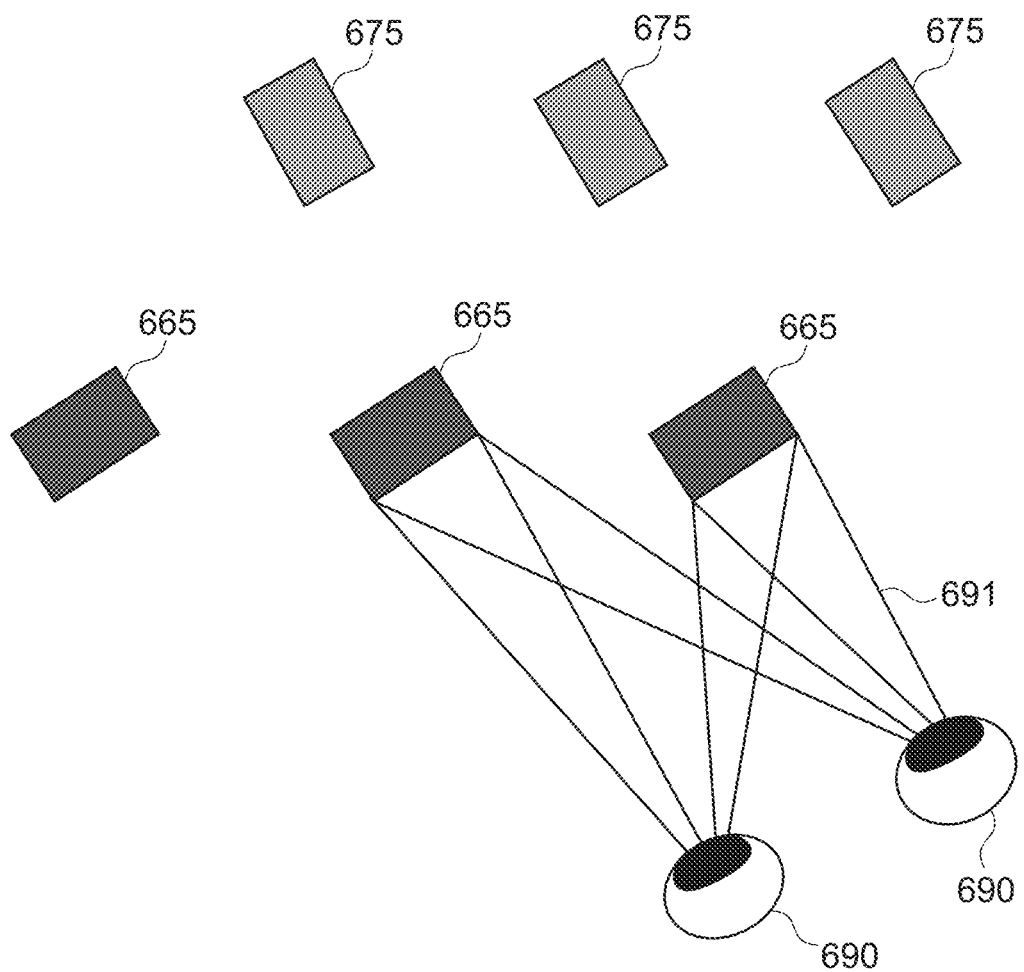
FIG. 20 is a schematic diagram showing an example of control processing of emphasizing a specific location.

FIG. 20 is a schematic diagram showing an example of control processing of emphasizing a specific location. In the embodiments described above, images of other locations are deactivated to enhance the visibility of the location. The present technology is not limited to this, and the visibility may be enhanced by changing the direction of the location at which the user wants to gaze.

As shown in FIG. 20, the reproduction control unit 26 controls the direction (angle) of the divided image 665 of the 8th floor, the visibility of which is desired to be increased, to be opposed to the direction of the field of view 691 of the user 690. Further, the reproduction control unit 26 controls the divided image 675 of the 9th floor to be in the direction perpendicular to the direction of the divided image 665 of the 8th floor.

In the case of the control for changing the direction of the location, the user state recognition unit 25 recognizes the movement of the head, the gaze point, the convergence, and the like of the user. The reproduction control unit 26 controls the angle of the image of the location, on which the user is focusing, on the basis of the recognized state of the user.

Figure 21A:
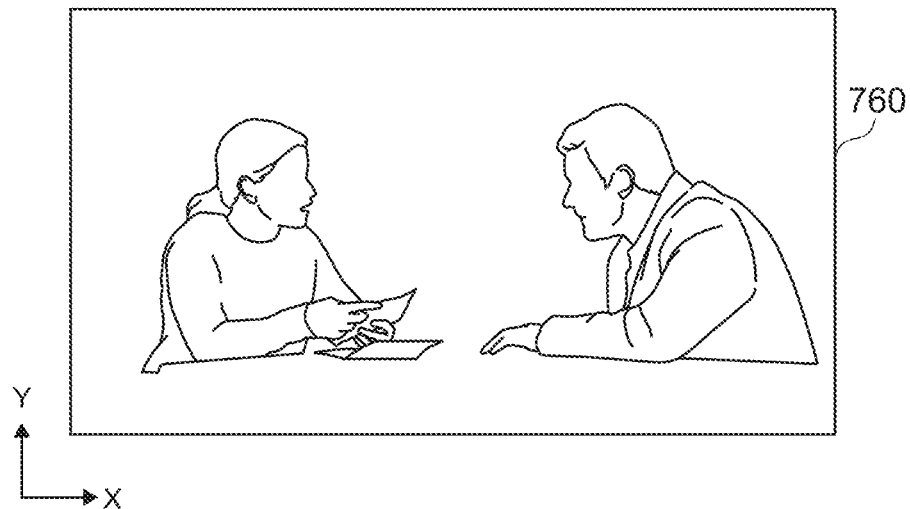
FIGS. 21A and 21B is a are schematic diagrams schematically showing another example of a display method for preventing blocking.
Figure 21B:
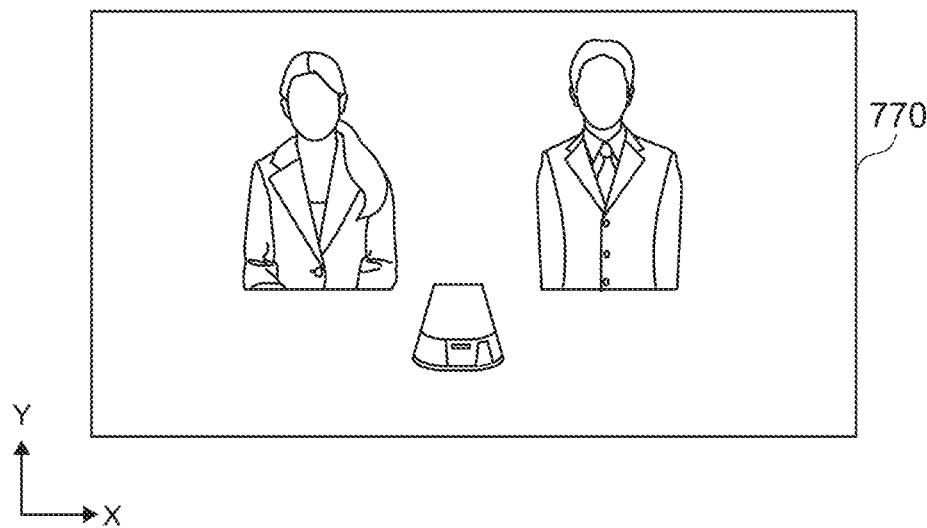

FIGS. 21A and 21B are schematic diagrams schematically showing another example of a display method for preventing blocking. A of FIG. 21A is a schematic view in which the background of the image showing the location of the 8th floor is transparent. FIG. 21B is a schematic view in which the background of the image showing the location of the 9th floor is transparent.

An image 760 of the 8th floor and an image 770 of the 9th floor are images in which the background of the scene of the conference on the 8th floor and the background of the scene of the presentation on the 9th floor of this embodiment are transparent. That is, the reproduction control unit 26 controls image processing of extracting only important objects, such as a person at the location, a person of interest, an object with which a person of interest is working, or a selected object, by image recognition or the like, and of making other backgrounds or the like transparent.

The reproduction control unit 26 obtains divided images obtained by dividing an image 760 of the 8th floor and an image 770 of the 9th floor along the Y-axis direction. Further, the reproduction control unit 26 alternately arranges the plurality of divided images of the 8th floor and the plurality of divided images of the 9th floor along the X-axis direction and simultaneously displays them. That is, the reproduction control unit 26 performs control, on the image 760 of the 8th floor and the image 770 of the 9th floor, similar to the image control shown in FIGS. 3 to 7, so that a composite image is generated.

The blocking may be prevented by displaying the images of the plurality of locations, on which the above image processing has been performed, in a superimposed manner with depths. Further, for example, the positions may be shifted such that the overlap of persons or objects in the depth direction is minimized.

Note that a method of preventing blocking is not limited. For example, if the number of locations is large, the depth is provided to the image at each location to increase the distance of depth. In this case, since the blocking is likely to occur, the reproduction control unit 26 may output the image of the location at a close position within a range in which the depth distance between the images of the locations can be determined by the convergence.

Figure 22A:
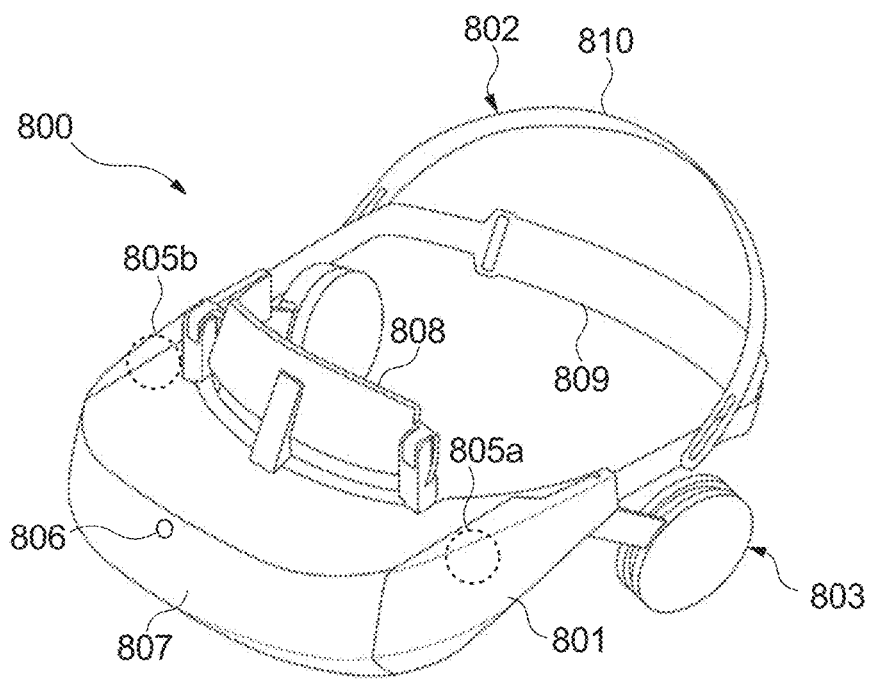
FIGS. 22A and 22B is a are diagrams showing a configuration example of an HMD according to another embodiment.
Figure 22B:
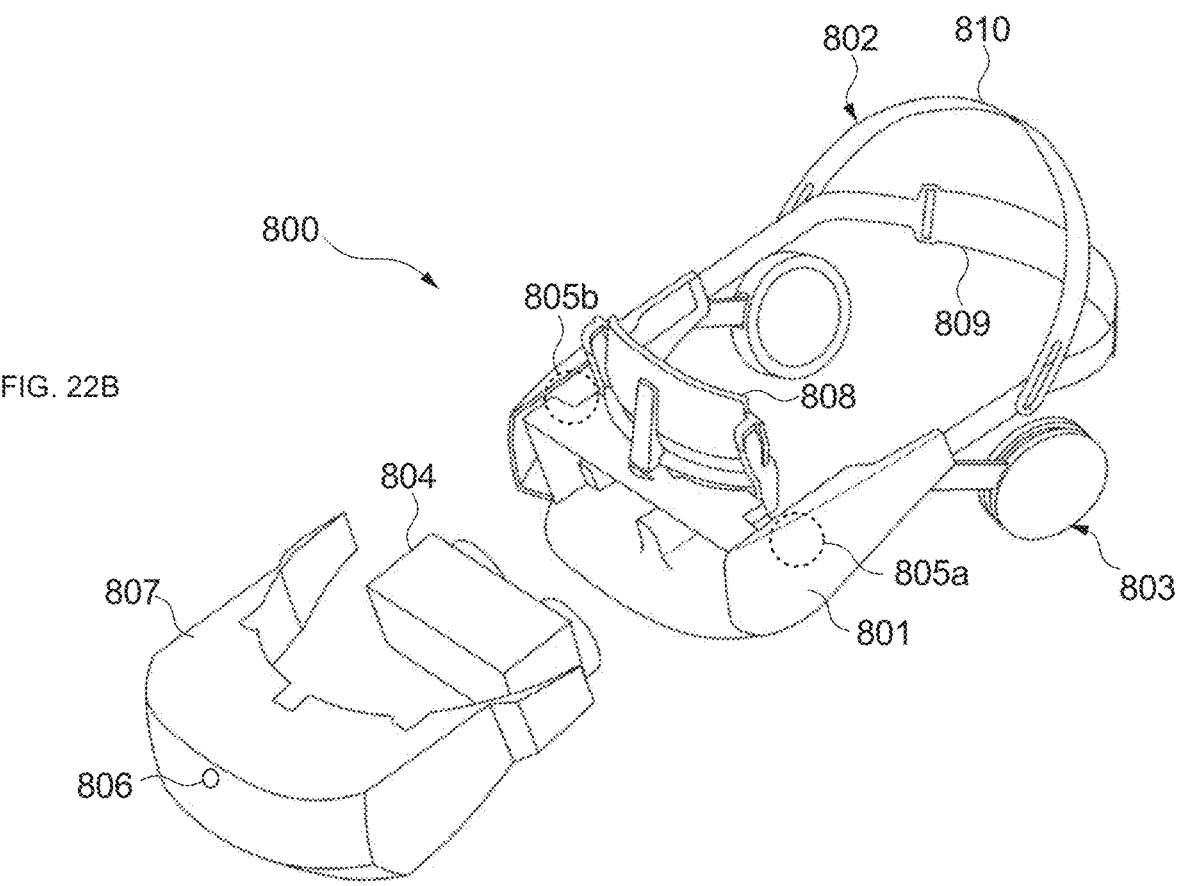

FIGS. 22A and 22B is a diagram showing an exemplary configuration of an HMD 800 according to another embodiment. FIG. 22A is a perspective view schematically showing the external appearance of the HMD 800, and FIG. 22B is a perspective view schematically showing the disassembled state of the HMD 800.

The HMD 800 includes a base 801, an attachment band 802, headphones 803, a display unit 804, an inward-oriented camera 805 (805*a*, 805*b*), an outward-oriented camera 806, and a cover 807.

The base 801 is a member disposed in front of the left and right eyes of the user and is provided with a frontal support portion 808 that abuts on the frontal portion of the user.

The attachment band 802 is attached to the head of the user. As shown in FIGS. 22A and 22B, the attachment band 802 includes a temporal band 809 and a parietal band 810. The temporal band 809 is connected to the base 801 and is attached so as to surround the head of the user from the temporal portion to the occipital portion. The parietal band 810 is connected to the temporal band 809 and is attached so as to surround the head of the user from the temporal portion to the parietal portion.

The headphones 803 are connected to the base 801 and disposed to cover the left and right ears of the user. The headphones 803 are provided with left and right speakers. The positions of the headphones 803 are manually or automatically controllable. The configuration for that is not limited, and any configuration may be adopted.

The display unit 804 is inserted into the base 801 and disposed in front of the user's eyes. A display is disposed inside the display unit 804. Any display device using, for example, liquid crystal or electroluminescence (EL) may be used as the display. Further, a lens system (not shown) for guiding an image displayed by the display to the left and right eyes of the user is disposed in the display unit 804.

The inward-oriented camera 805 includes a left-eye camera 805*a* and a right-eye camera 805*b* that are capable of capturing images of the left eye and the right eye of the user. The left-eye camera 805*a* and the right-eye camera 805*b* are installed at predetermined positions of the HMD 800, specifically, at predetermined positions of the base 801. For example, line-of-sight information or the like relating to the line of sight of the user can be detected on the basis of the images of the left eye and the right eye captured by the left-eye camera 805*a* and the right-eye camera 805*b*.

As the left-eye camera 805*a* and the right-eye camera 805*b*, for example, a digital camera including an image sensor such as a complementary metal-oxide semiconductor (CMOS) sensor or a charge coupled device (CCD) sensor is used. Further, for example, an infrared camera that includes an infrared illumination such as an infrared LED may be used.

The outward-oriented camera 806 is disposed at the center of the cover 807 toward the outside (opposite side to the user). The outward-oriented camera 806 is capable of capturing an image of a real space on the front side of the user. A digital camera that includes, for example, an image sensor such as a CMOS sensor or a CCD sensor is used as the outward-oriented camera 806.

The cover 807 is attached to the base 801 and configured to cover the display unit 804. The HMD 800 having such a configuration serves as an immersive head-mounted display configured to cover the field of view of the user. For example, a three-dimensional virtual location is displayed by the HMD 800. When wearing the HMD 800, the user can experience virtual reality (VR) or the like.

Figure 23:
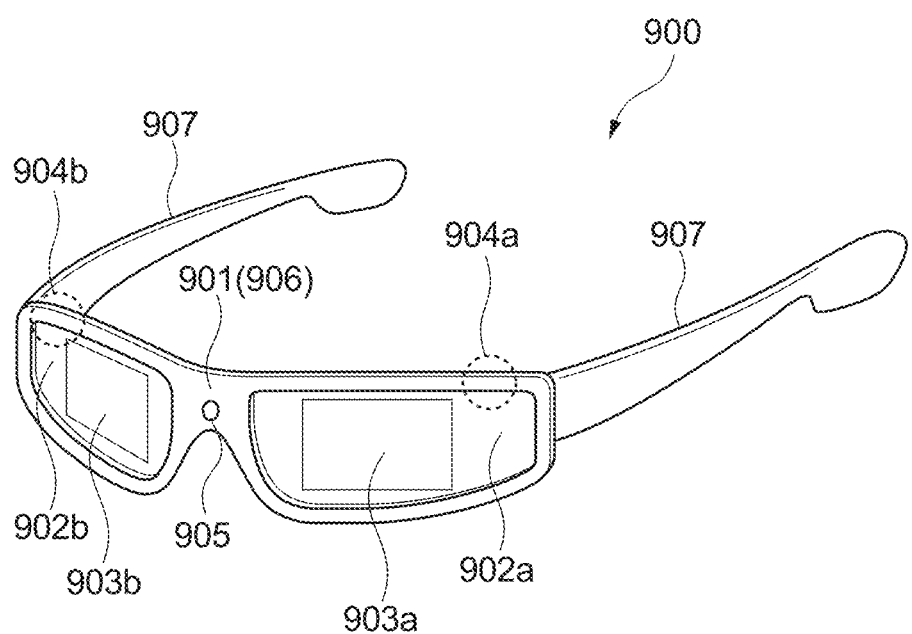
FIG. 23 is a perspective view showing an external example of an HMD according to another embodiment.

FIG. 23 is a perspective view showing an exemplary appearance of an HMD 900 according to another embodiment. The HMD 900 is a glasses-type device including a transmissive display and is also referred to as AR glasses. The HMD 900 includes a frame 901, a left-eye lens 902a and a right-eye lens 902b, a left-eye display 903a and a right-eye display 903b, a left-eye camera 904a and a right-eye camera 904b, and an outward-oriented camera 905.

The frame 901 has the shape of glasses and includes a rim portion 906 and temple portions 907. The rim portion 906 is a portion disposed in front of the right and left eyes of the user and supports each of the left-eye lens 902a and the right-eye lens 902b. The temple portions 907 extend rearward from both ends of the rim portion 906 toward both ears of the user and are attached to both ears at the tips. The rim portion 906 and the temple portions 907 are formed of, for example, material such as a synthetic resin or metal.

The left-eye lens 902a and the right-eye lens 902b are respectively disposed in front of the left and right eyes of the user so as to cover at least a part of the field of view of the user. Typically, each lens is designed to correct the visual acuity of the user. Of course, the present technology is not limited to this, and a so-called plain-glass lens may be used.

The left-eye display 903a and the right-eye display 903b are transmissive displays and are disposed so as to cover a part of regions of the left-eye lens 902a and the right-eye lens 902b, respectively. That is, the left-eye lens 902a and the right-eye lens 902b are respectively disposed in front of the left and right eyes of the user.

Images for the left eye and the right eye and the like are displayed on the left-eye display 903a and the right-eye display 903b, respectively. The user wearing the HMD 900 can view the images displayed on the displays 903a and 903b at the same time as viewing a real scene. This makes it possible for the user to experience augmented reality (AR) and the like.

For example, a virtually displayed object (virtual object) is displayed on each of the displays 903a and 903b. For example, CGs (Computer Graphics) of characters or the like, photographs, letters, and the like can be displayed as virtual objects. Of course, the virtual objects are not limited to them, and any virtual object may be displayed.

As the left-eye display 903a and the right-eye display 903b, for example, a transmissive organic electroluminescence display, a liquid crystal display (LCD), or the like is used. In addition, the specific configurations of the left-eye display 903a and the right-eye display 903b are not limited. For example, a transmissive display using an arbitrary method such as a method of projecting and displaying an image on a transparent screen or a method of displaying an image using a prism may be used as appropriate.

The left-eye camera 904a and the right-eye camera 904b are appropriately installed on the frame 901 such that images of the left eye and the right eye of the user can be respectively captured. For example, line-of-sight information regarding a line of sight of the user can be detected on the basis of the images of the left eye and the right eye that are respectively captured by the left-eye camera 904a and the right-eye camera 904b.

A digital camera that includes, for example, an image sensor such as a CMOS sensor or a CCD sensor is used as the left-eye camera 904a and the right-eye camera 904b. Further, for example, an infrared camera that includes an infrared illumination such as an infrared LED may be used.

The outward-oriented camera 905 is disposed in a center portion of the frame 901 (rim portion 906) to be oriented outward (toward the side opposite to the user). The outward-oriented camera 905 is capable of capturing an image of a real space within the field of view of the user. Thus, the outward-oriented camera 905 is capable of generating a captured image in which a real space appears.

In this embodiment, the outward-oriented camera 905 captures an image of the range on the front side as viewed from the user and the range including the display area of the transmissive display 903. That is, an image of a real space is captured so as to include a range that is visible through the display region as viewed from the user. A digital camera that includes, for example, an image sensor such as a CMOS sensor or a CCD sensor is used as the outward-oriented camera 905.

The information processing method and the program according to the present technology may be performed, and the information processing apparatus according to the present technology may be constructed, by linking a computer mounted on the HMD with another computer capable of communicating via a network or the like or by another computer capable of communicating with the HMD.

That is, the information processing method and the program according to the present technology can be performed not only in a computer system formed of a single computer, but also in a computer system in which a plurality of computers operates cooperatively. Note that, in the present disclosure, the system refers to a set of components (such as apparatuses and modules (parts)) and it does not matter whether all of the components are in a single housing. Thus, a plurality of apparatuses accommodated in separate housings and connected to each other through a network, and a single apparatus in which a plurality of modules is accommodated in a single housing are both the system.

The execution of the information processing method and the program according to the present technology by the computer system includes, for example, both a case in which the control of the divided images, the setting of the priority space, the control of the blocking, and the like are performed by a single computer; and a case in which the respective processes are performed by different computers. Further, the execution of each process by a predetermined computer includes causing another computer to perform a portion of or all of the process and acquiring a result of it.

In other words, the information processing method and the program according to the present technology are also applicable to a configuration of cloud computing in which a single function is shared and cooperatively processed by a plurality of apparatuses through a network.

The respective configurations of the information processing apparatus, the user state recognition unit, the environment recognition unit, the user recognition unit, and the like; the control flow of the communication system; and the like described with reference to the respective figures are merely embodiments, and any modifications may be made thereto without departing from the spirit of the present technology. In other words, for example, any other configurations or algorithms for purpose of practicing the present technology may be adopted.

Note that the effects described in the present disclosure are merely illustrative and not restrictive, and other effects may be obtained. The above description of a plurality of effects does not necessarily mean that these effects are simultaneously exhibited. It means that at least one of the above-described effects can be obtained depending on the conditions and the like, and of course, there is a possibility that an effect not described in the present disclosure can be exhibited.

At least two of the features among the features of the embodiments described above can also be combined. In other words, various features described in the respective embodiments may be combined discretionarily regardless of the embodiments.

Note that the present technology may also take the following configurations.

(1) An information processing apparatus, including:
  an image obtaining unit that obtains
    a plurality of first divided images obtained by dividing a first image showing a first location along a second direction substantially perpendicular to a first direction, and
    a plurality of second divided images obtained by dividing a second image showing a second location along the second direction; and
  a display control unit that arranges and simultaneously displays the plurality of first divided images and the plurality of second divided images along the first direction on a display device of a user at a third location.

(2) The information processing apparatus according to (1), in which
  the display control unit changes a relative relationship of visibility between the plurality of first divided images and the plurality of second divided images in accordance with a change in situation of at least one of the first location, the second location, or the third location.

(3) The information processing apparatus according to (2), in which
  the change in situation includes at least one of a change in motion of an object or a change in sound emitted by the object at at least one of the first location, the second location, or the third location.

(4) The information processing apparatus according to (3), in which
  the object includes a person at the first location or the second location.

(5) The information processing apparatus according to (4), in which
  the change in situation includes a call from the person to the user of the display device as the change in sound emitted by the object.

(6) The information processing apparatus according to any one of (3) to (5), in which
  the object includes the user of the display device.

(7) The information processing apparatus according to (6), in which
  the change in situation includes a change in posture of the user of the display device.

(8) The information processing apparatus according to (7), in which
  the first direction is a horizontal direction, and
  the change in posture of the user of the display device is a change in posture in the horizontal direction.

(9) The information processing apparatus according to any one of (6) to (8), in which
  the display control unit controls the display device such that positions of the plurality of first divided images and the plurality of second divided images are different from each other in a depth direction when viewed from the user, and
  the change in situation includes a change in convergence distance of the user of the display device.

(10) The information processing apparatus according to (9), in which
  the display control unit controls the display device such that a plurality of divided images, which corresponds to the convergence distance of the user, is arranged closer to the user than another plurality of divided images, which does not correspond to the convergence distance of the user, between the plurality of first divided images and the plurality of second divided images.

(11) The information processing apparatus according to any one of (2) to (10), in which
  the display control unit makes the visibility of images of a location where the change in situation has occurred higher than the visibility of other images between the plurality of first divided images and the plurality of second divided images.

(12) The information processing apparatus according to any one of (2) to (11), further including
  a sound output control unit that controls a sound output device of the user to change a relative relationship between a first sound output corresponding to the first image and a second sound output corresponding to the second image in accordance with a change in the relative relationship of visibility.

(13) The information processing apparatus according to (12), in which
  the sound output control unit makes a sound output corresponding to a plurality of divided images having higher visibility larger than a sound output corresponding to another plurality of divided images between the plurality of first divided images and the plurality of second divided images.

(14) The information processing apparatus according to (12) or (13), in which
  the display control unit causes the display device to display an image in which a sound output corresponding to a plurality of divided images having lower visibility between the plurality of first divided images and the plurality of second divided images is converted into text.

(15) The information processing apparatus according to any one of (1) to (14), further including
  a communication control unit that transmits an image to a first display device at the first location and a second display device at the second location, in which
  the image obtaining unit obtains an image showing the third location and including an image of the user of the display device obtained by an imaging device, and
  the communication control unit transmits the image showing the third location to the first display device and the second display device simultaneously and in real time.

(16) An information processing method executed by a computer system, the method including:
  obtaining a plurality of first divided images obtained by dividing a first image showing a first location along a second direction substantially perpendicular to a first direction, and a plurality of second divided images obtained by dividing a second image showing a second location along the second direction; and
  arranging and simultaneously displaying the plurality of first divided images and the plurality of second divided images along the first direction on a display device of a user at a third location.

(17) A program causing a computer system to execute the steps of:
  obtaining a plurality of first divided images obtained by dividing a first image showing a first location along a second direction substantially perpendicular to a first direction, and a plurality of second divided images obtained by dividing a second image showing a second location along the second direction; and arranging and simultaneously displaying the plurality of first divided images and the plurality of second divided images along the first direction on a display device of a user at a third location.

REFERENCE SIGNS LIST 13 display
14 speaker
20 communication control apparatus
23 image output unit
24 sound output unit
26 reproduction control unit
27 communication control unit
33 display
34 speaker
43 image output unit
44 sound output unit
48 reproduction control unit
49 communication control unit
60 image of 8th floor
65 plurality of first divided images
70 image of 9th floor
75 plurality of second divided images
80 composite image

The invention claimed is:

1. An information processing apparatus, comprising:
an image obtaining unit configured to obtain:
a plurality of first divided images obtained by division of a first image showing a first location along a second direction substantially perpendicular to a first direction, and
a plurality of second divided images obtained by division of a second image showing a second location along the second direction; and
a display control unit configured to:
arrange and simultaneously display the plurality of first divided images and the plurality of second divided images along the first direction on a display device of a user at a third location; and
change a relative relationship of visibility between the plurality of first divided images and the plurality of second divided images based on a change in situation of at least one of the first location, the second location, or the third location.

2. The information processing apparatus according to claim 1, wherein
the change in situation includes at least one of a change in motion of an object or a change in sound emitted by the object at least one of the first location, the second location, or the third location.

3. The information processing apparatus according to claim 2, wherein
the object includes a person at the first location or the second location.

4. The information processing apparatus according to claim 3, wherein
the change in situation includes a call from the person to the user of the display device as the change in sound emitted by the object.

5. The information processing apparatus according to claim 2, wherein
the object includes the user of the display device.

6. The information processing apparatus according to claim 5, wherein
the change in situation includes a change in posture of the user of the display device.

7. The information processing apparatus according to claim 6, wherein
the first direction is a horizontal direction, and
the change in posture of the user of the display device is a change in posture in the horizontal direction.

8. The information processing apparatus according to claim 5, wherein
the display control unit is further configured to control the display device such that positions of the plurality of first divided images and the plurality of second divided images are different from each other in a depth direction when viewed from the user, and
the change in situation includes a change in convergence distance of the user of the display device.

9. The information processing apparatus according to claim 8, wherein
the display control unit is further configured to control the display device such that a plurality of divided images, which corresponds to the convergence distance of the user, is arranged closer to the user than another plurality of divided images, which does not correspond to the convergence distance of the user, between the plurality of first divided images and the plurality of second divided images.

10. The information processing apparatus according to claim 1, wherein
the display control unit is further configured to make the visibility of images of a location where the change in situation has occurred higher than the visibility of other images between the plurality of first divided images and the plurality of second divided images.

11. The information processing apparatus according to claim 1, further comprising
a sound output control unit configured to control a sound output device of the user to change a relative relationship between a first sound output corresponding to the first image and a second sound output corresponding to the second image based on a change in the relative relationship of visibility.

12. The information processing apparatus according to claim 11, wherein
the sound output control unit is further configured to make a sound output corresponding to a plurality of divided images having higher visibility larger than a sound output corresponding to another plurality of divided images between the plurality of first divided images and the plurality of second divided images.

13. The information processing apparatus according to claim 11, wherein
the display control unit is further configured to cause the display device to display an image in which a sound output corresponding to a plurality of divided images having lower visibility between the plurality of first divided images and the plurality of second divided images is converted into text.

14. The information processing apparatus according to claim 1, further comprising
a communication control unit configured to transmit an image to a first display device at the first location and a second display device at the second location, wherein the image obtaining unit is further configured to obtain an image showing the third location and including an image of the user of the display device obtained by an imaging device, and the communication control unit is further configured to transmit the image showing the third location to the first display device and the second display device simultaneously and in real time.

15. An information processing method executed by a computer system, the method comprising:

obtaining a plurality of first divided images obtained by dividing a first image showing a first location along a second direction substantially perpendicular to a first direction, and a plurality of second divided images obtained by dividing a second image showing a second location along the second direction;

arranging and simultaneously displaying the plurality of first divided images and the plurality of second divided images along the first direction on a display device of a user at a third location; and changing a relative relationship of visibility between the plurality of first divided images and the plurality of second divided images based on a change in situation of at least one of the first location, the second location, or the third location.

16. A non-transitory computer-readable medium having stored thereon, computer-executable instructions which, when executed by a processor of an information processing device, cause the processor to execute operations, the operations:

obtaining a plurality of first divided images obtained by dividing a first image showing a first location along a second direction substantially perpendicular to a first direction, and a plurality of second divided images obtained by dividing a second image showing a second location along the second direction;

arranging and simultaneously displaying the plurality of first divided images and the plurality of second divided images along the first direction on a display device of a user at a third location; and changing a relative relationship of visibility between the plurality of first divided images and the plurality of second divided images based on a change in situation of at least one of the first location, the second location, or the third location.

\* \* \* \* \*